(12) United States Patent
Jameson

(10) Patent No.: US 7,620,573 B2
(45) Date of Patent: Nov. 17, 2009

(54) FINANCIAL ACCOUNTING METHODS AND SYSTEMS TO ACCOUNT FOR ASSETS AND LIABILITIES

(75) Inventor: Joel Jameson, 940 Lundy La., Los Altos, CA (US) 94024-5940

(73) Assignee: Joel Jameson, Los Altos, CA (US)

( * ) Notice: Subject to any disclaimer, the term of this patent is extended or adjusted under 35 U.S.C. 154(b) by 50 days.

(21) Appl. No.: 11/464,980

(22) Filed: Aug. 16, 2006

(65) Prior Publication Data

US 2007/0055589 A1 Mar. 8, 2007

Related U.S. Application Data

(60) Provisional application No. 60/708,683, filed on Aug. 16, 2005, provisional application No. 60/706,931, filed on Aug. 10, 2005.

(51) Int. Cl.
*G07B 17/00* (2006.01)
*G07F 19/00* (2006.01)

(52) U.S. Cl. ...................................................... 705/30

(58) Field of Classification Search ........................ None
See application file for complete search history.

(56) References Cited

U.S. PATENT DOCUMENTS

2002/0111891 A1 8/2002 Hoffman et al.
2003/0158811 A1 8/2003 Sanders et al.
2004/0181378 A1 9/2004 Gilmore
2005/0125318 A1 6/2005 Jameson

OTHER PUBLICATIONS

"Accounting Information Technology, and Business Solutions" by Anita S. Hollander, Eric L. Denna and J. Owen Cherrington., McGraw-Hill Companies Inc., 1996, Chapter 3 pp. 79-131.*
Zacharias, "A Note on the Hicksian Concept of Income", Working Paper, Feb. 2002, website.
Black, "The Magic In Earnings: Economic Earnings versus Accounting Earnings", Financial Analysts Journal, pp. 19-24, Nov./Dec. 1980.
Bromwich, Macve, and Sunder, "FASB/IASB: Revisiting the Concepts, A comment on Hicks and the concept of 'income' in the conceptual framework", web article, Jul. 24, 2005.
Bullen and Crook, "Revisiting the concepts: a new conceptual framework", FASB/IASB website, May 2005.
Herz, "Program F: Accounting and Financial Reporting—FASB: How to report off-balance sheet items", CPAR website, May 2006.
Hicks, Value and Capital, 1946, pp. 170-188, Oxford, Clarendon Press.

(Continued)

*Primary Examiner*—F. Zeender
*Assistant Examiner*—Mussa Shaawat
(74) *Attorney, Agent, or Firm*—Adam K. Sacharoff; Much Shelist

(57) ABSTRACT

For several decades, financial accounting theory and practice has been plagued by difficulties regarding accounting for asset and liability value changes. A general solution to this problem is disclosed that serves both the "Going-concern Earning-power" and "Asset and Liability" views of income determination.

8 Claims, 16 Drawing Sheets

OTHER PUBLICATIONS

Jameson, "FASB and the IASB versus J.R. Hicks", Research In Accounting Regulation, pp. 331-334, 2006, vol. 18, Elsevier.

Jameson, "How FASB and the IASB should apply Hicksian theory to calculate income", Research In Accountig Regulation, pp. 335-349, 2006, vol. 18, Elsevier.

FASB, Statement of Financial Accounting Concepts No. 7: Using Cash Flow Information and Present Value in Accounting Measurements, Feb. 2000, FASB, Norwalk, CT.

Anthony, Robert, "We don't have the accounting concepts we need", Harvard Business Review, Jan.-Feb. 1987, pp. 75-83.

Barker, Richard "Reporting Financial Performance" Accounting Horizons, Jun. 2004, pp. 157-172.

Barth, Mary; Standard-Setters, Measurement Issues, and the Relevance of Research, ICAEW website, Dec. 2006, United Kingdom.

Nissim and Penman, Preliminary Draft Of White Paper Number Two: On The Application Of Fair Value Accounting, Aug. 2007, Columbia University, New York.

Previts and Merino, A history of accountancy in the United States: The cultural significance of accounting, 1998, pp. 175-297, Ohio State University Press, Columbus, OH.

* cited by examiner

Year

Asset and Liability View
(a.k.a. Fair Value Accounting)

1900 --

Going-concern Earning-power View

Revenue and Expense View
(a.k.a. Historic Costing
and Matching )

1950 --

2000 -- Asset and Liability View
(a.k.a. Fair Value Accounting)

Calculates Comprehensive Income Net Income

Fig. 2

Income Statement

|  |  | [A] | [B] | [C] | [D] | [E] | [F] |
|---|---|---|---|---|---|---|---|
| [1] | Going Concern | | | | | | |
| [2] |   Operating Income | | | | | | |
| [3] |     Revenues | ⋱ | | | | | |
| [4] |     Total Revenues | | | #.## | | | |
| [5] |     Expenses | ⋱ | | | | | |
| [6] |     Total Expenses | | | #.## | | | |
| [7] |   Total Operating Income | | | | #.## | | |
| [8] |   Market Income (Expected) | | | | | | |
| [9] |     Asset Appreciations | ⋱ | | | | | |
| [10] |     Total Asset Appreciations | | | #.## | | | |
| [11] |     Asset Depreciations | ⋱ | | | | | |
| [12] |     Total Asset Depreciations | | | #.## | | | |
| [13] |     Favorable Liability Depreciations | ⋱ | | | | | |
| [14] |     Total Liability Depreciations | | | #.## | | | |
| [15] |     Unfavorable Liability Appreciations | ⋱ | | | | | |
| [16] |     Total Liability Appreciations | | | #.## | | | |
| [17] |   Total Market Income | | | | #.## | | |
| [18] | Net Income (Total Going Concern Income) | | | | | #.## | |
| [19] | | | | | | | |
| [20] | Market Moves | | | | | | |
| [21] |   Asset Gains | ⋱ | | | | | |
| [22] |   Total Asset Gains | | | #.## | | | |
| [23] |   Asset Losses | ⋱ | | | | | |
| [24] |   Total Asset Losses | | | #.## | | | |
| [25] |   Favorable Liability Gains | ⋱ | | | | | |
| [26] |   Total Liability Gains | | | #.## | | | |
| [27] |   Unfavorable Liability Losses | ⋱ | | | | | |
| [28] |   Total Liability Losses | | | #.## | | | |
| [29] | Total Market Moves Income | | | | | #.## | |
| [30] | | | | | | | |
| [31] | Total Comprehensive Income | | | | | | #.## |

Fig. 3

Balance Sheet

|  | [A] Account | [B] Assets | [C] Liabilities |
|---|---|---|---|
| [1] | Cash | 23,992.00 | |
| [2] | Public Market Investments | 745,000.00 | |
| [3] | Assumed Pension Obligations | | 583,454.00 |
| [4] | Shareholder Equity | | 185,538.00 |
| [5] | Total | 768,992.00 | 768,992.00 |

Income Statement Entries Based Upon

| Balance Sheet Entries Based Upon | Change in A/L Account Value | Smoothing / Allocations | Operations | Ex Ante Equation |
|---|---|---|---|---|
| Historic Cost |  | C12 | C13 | C14 |
| Present Value | C21 | C22 | C23 | C24 |
| Market Value | C31 | C32 | C33 | C34 |

Fig. 5

| Asset (A) Accounts | | Liability (L) Accounts | |
|---|---|---|---|
| Debit | Credit | Debit | Credit |
| | | | |

| Expense (E) Accounts | | Revenue (R) Accounts | |
|---|---|---|---|
| Debit | Credit | Debit | Credit |
| | | | |

| Liability Market Income (LMI) Accounts | | Asset Market Income (AMI) Accounts | |
|---|---|---|---|
| Debit | Credit | Debit | Credit |
| | | | |

| Liability Market Moves (LMM) Accounts | | Asset Market Moves (AMM) Accounts | |
|---|---|---|---|
| Debit | Credit | Debit | Credit |
| | | | |

Fig. 7
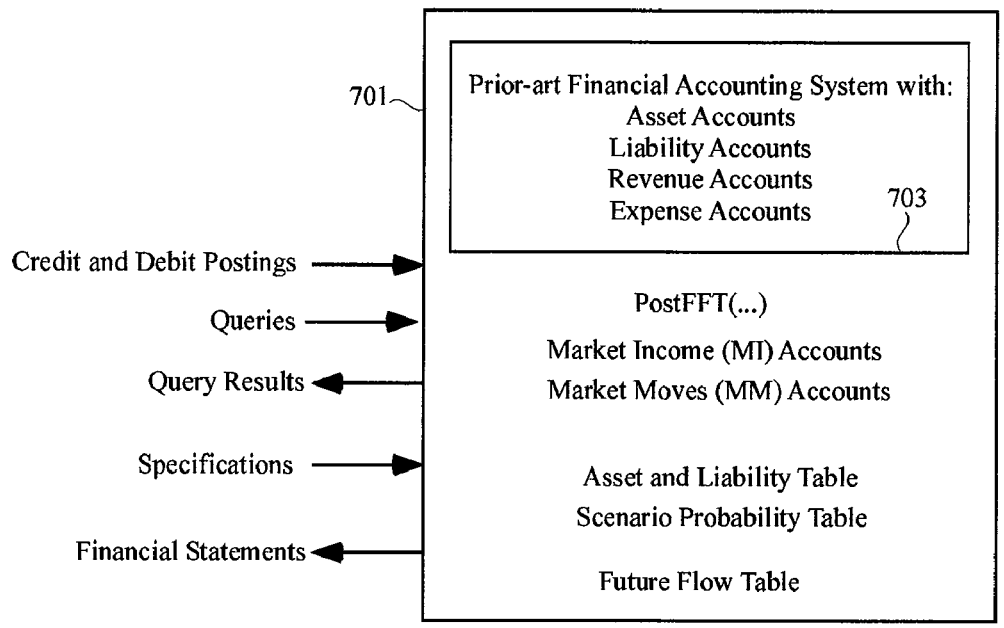
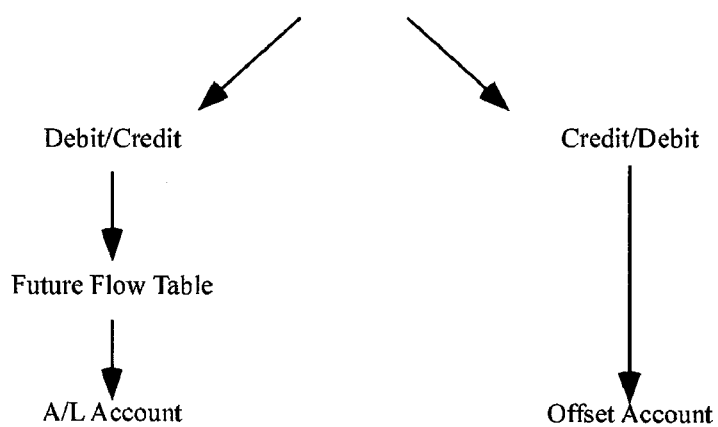
Fig. 8

BldEqyA
PensionL
Lease
BondA
ExchQ
AutoA

Fig. 11

ExchQ Flows

| | [A]<br>Scenario<br>Probability | [B]<br>ScenarioFlowIn1<br>0.4 | [C] | [D]<br>ScenarioFlowIn2<br>0.6 | [E] | [F]<br>ScenarioFlowOut1<br>1.0 | [G] |
|---|---|---|---|---|---|---|---|
| | Period | Flow-in | Present Value | Flow-in | Present Value | Flow-out | Present Value |
| [1] | 2000 | - | - | - | - | 5,000.00 | 5,000.00 |
| [2] | 2001 | - | - | - | - | - | - |
| [3] | 2002 | - | - | - | - | 500.00 | 413.22 |
| [4] | 2003 | - | - | - | - | 500.00 | 375.66 |
| [5] | 2004 | - | - | 4,000.00 | 2,732.05 | 500.00 | 341.51 |
| [6] | 2005 | - | - | 4,000.00 | 2,483.69 | 500.00 | 310.46 |
| [7] | 2006 | 50,000.00 | 28,223.70 | 4,000.00 | 2,257.90 | 500.00 | 282.24 |
| [8] | 2007 | 10,000.00 | 5,131.58 | 4,000.00 | 2,052.63 | - | - |
| [9] | 2008 | 10,000.00 | 4,665.07 | 4,000.00 | 1,866.03 | - | - |
| [10] | 2009 | 10,000.00 | 4,240.98 | 4,000.00 | 1,696.39 | - | - |
| [11] | | | | | | | |
| [12] | Sum | | 42,261.33 | | 13,088.69 | | 6,723.09 |
| [13] | | | | | | | |
| [14] | Mathematically Expected | | | | | | |
| [15] | Flow-in | | Probability | Expected | | | |
| [16] | ScenarioFlowIn1 | 42,261.33 | 0.40 | 16,904.53 | | | |
| [17] | ScenarioFlowIn2 | 13,088.69 | 0.60 | 7,853.21 | | | |
| [18] | Total | | | 24,757.74 | | | |
| [19] | Flow-out | | | | | | |
| [20] | ScenarioFlowOut1 | 6,723.09 | 1.00 | 6,723.09 | | | |
| [21] | Net Present Value | | | 18,034.66 | | | |

Fig. 12

Asset and Liability Table

| | [A]<br>Account | [B]<br>Position Value<br>Basis | [C]<br>R |
|---|---|---|---|
| [1] | BldEqyA | MarketValue | 0.01 |
| [2] | PensionL | PresentValue | 0.10 |
| [3] | LeaseA | PresentValue | 0.10 |
| [4] | LeaseL | PresentValue | 0.10 |
| [5] | BondA | MarketValue | 0.06 |
| [6] | ExchQA | PresentValue | 0.10 |
| [7] | ExchQL | PresentValue | 0.10 |
| [8] | AutoA | MarketValue | (0.25) |
| [9] | CashA | MarketValue | 0.02 |

Fig. 13

Scenario Probability Table

| | [A]<br>Account | [B]<br>Scenario | [C]<br>Probability |
|---|---|---|---|
| [1] | PensionL | ScenarioPensionL | 1.00 |
| [2] | LeaseA | ScenarioLeaseA | 1.00 |
| [3] | LeaseL | ScenarioLeaseL | 1.00 |
| [4] | ExchQA | ScenarioFlowIn1 | 0.40 |
| [5] | ExchQA | ScenarioFlowIn2 | 0.60 |
| [6] | ExchQL | ScenarioFlowOut1 | 1.00 |

Fig. 14

Future Flow Table

| | | [A]<br>Account | [B]<br>ScenarioID | [C]<br>Date | [D]<br>CdType | [E]<br>Amount |
|---|---|---|---|---|---|---|
| 2000 | [1] | PensionL | ScenarioPensionL | 2010 | Credit | 518.75 |
| | [2] | LeaseA | ScenarioLeaseA | 2001 | Debit | 140.00 |
| | [3] | LeaseA | ScenarioLeaseA | 2002 | Debit | 140.00 |
| | [4] | LeaseA | ScenarioLeaseA | 2003 | Debit | 140.00 |
| | [5] | LeaseA | ScenarioLeaseA | 2004 | Debit | 140.00 |
| | [6] | LeaseL | ScenarioLeaseL | 2001 | Credit | 140.00 |
| | [7] | LeaseL | ScenarioLeaseL | 2002 | Credit | 140.00 |
| | [8] | LeaseL | ScenarioLeaseL | 2003 | Credit | 140.00 |
| | [9] | LeaseL | ScenarioLeaseL | 2004 | Credit | 140.00 |
| | [10] | ExchQA | ScenarioFlowIn1 | 2006 | Debit | 50,000.00 |
| | [11] | ExchQA | ScenarioFlowIn1 | 2007 | Debit | 10,000.00 |
| | [12] | ExchQA | ScenarioFlowIn1 | 2008 | Debit | 10,000.00 |
| | [13] | ExchQA | ScenarioFlowIn1 | 2009 | Debit | 10,000.00 |
| | [14] | ExchQA | ScenarioFlowIn2 | 2004 | Debit | 4,000.00 |
| | [15] | ExchQA | ScenarioFlowIn2 | 2005 | Debit | 4,000.00 |
| | [16] | ExchQA | ScenarioFlowIn2 | 2006 | Debit | 4,000.00 |
| | [17] | ExchQA | ScenarioFlowIn2 | 2007 | Debit | 4,000.00 |
| | [18] | ExchQA | ScenarioFlowIn2 | 2008 | Debit | 4,000.00 |
| | [19] | ExchQA | ScenarioFlowIn2 | 2009 | Debit | 4,000.00 |
| | [20] | ExchQL | ScenarioFlowOut1 | 2000 | Credit | 5,000.00 |
| | [21] | ExchQL | ScenarioFlowOut1 | 2002 | Credit | 500.00 |
| | [22] | ExchQL | ScenarioFlowOut1 | 2003 | Credit | 500.00 |
| | [23] | ExchQL | ScenarioFlowOut1 | 2004 | Credit | 500.00 |
| | [24] | ExchQL | ScenarioFlowOut1 | 2005 | Credit | 500.00 |
| | [25] | ExchQL | ScenarioFlowOut1 | 2006 | Credit | 500.00 |
| 2001 | [26] | ExchQL | ScenarioFlowOut1 | 2000 | Debit | 5,000.00 |
| | [27] | ExchQL | ScenarioFlowOut1 | 2001 | Credit | 5,000.00 |
| | [28] | PensionL | ScenarioPensionL | 2009 | Credit | 171.49 |
| | [29] | PensionL | ScenarioPensionL | 2011 | Credit | 518.75 |
| | [30] | LeaseA | ScenarioLeaseA | 2001 | Debit | 70.00 |
| | [31] | LeaseA | ScenarioLeaseA | 2002 | Debit | 70.00 |
| | [32] | LeaseA | ScenarioLeaseA | 2003 | Debit | 70.00 |
| | [33] | LeaseA | ScenarioLeaseA | 2004 | Debit | 70.00 |
| | [34] | ExchQL | ScenarioFlowOut1 | 2001 | Debit | 4,500.00 |
| | [35] | ExchQL | ScenarioFlowOut1 | 2001 | Debit | 500.00 |
| | [36] | ExchQA | ScenarioFlowIn1 | 2007 | Credit | 1,000.00 |
| | [37] | LeaseA | ScenarioLeaseA | 2001 | Credit | 210.00 |
| | [38] | LeaseL | ScenarioLeaseL | 2001 | Debit | 140.00 |

Fig. 15

2000 Credits and Debits

|      | [A] Debit | [B] Credit | [C] Amount |
|------|-----------|------------|------------|
| [1]  | CashA     | Shareholder EquityL | 100,000.00 |
| [2]  | BldEqyA   | CashA      | 4,000.00   |
| [3]  | PensionE  | PensionL   | 200.00     |
| [4]  | CashA     | RevMiscR   | 1,000.00   |
| [5]  | LeaseA    | LeaseAMM   | 127.27     |
| [6]  | LeaseLMM  | LeaseL     | 127.27     |
| [7]  | LeaseA    | LeaseAMM   | 115.70     |
| [8]  | LeaseLMM  | LeaseL     | 115.70     |
| [9]  | LeaseA    | LeaseAMM   | 105.18     |
| [10] | LeaseLMM  | LeaseL     | 105.18     |
| [11] | LeaseA    | LeaseAMM   | 95.62      |
| [12] | LeaseLMM  | LeaseL     | 95.62      |
| [13] | BondA     | CashA      | 800.00     |
| [14] | ExchQA    | ExchQR     | 11,289.48  |
| [15] | ExchQA    | ExchQR     | 2,052.63   |
| [16] | ExchQA    | ExchQR     | 1,866.03   |
| [17] | ExchQA    | ExchQR     | 1,696.39   |
| [18] | ExchQA    | ExchQR     | 1,639.23   |
| [19] | ExchQA    | ExchQR     | 1,490.21   |
| [20] | ExchQA    | ExchQR     | 1,354.74   |
| [21] | ExchQA    | ExchQR     | 1,231.58   |
| [22] | ExchQA    | ExchQR     | 1,119.62   |
| [23] | ExchQA    | ExchQR     | 1,017.83   |
| [24] | ExchQE    | ExchQL     | 5,000.00   |
| [25] | ExchQE    | ExchQL     | 413.22     |
| [26] | ExchQE    | ExchQL     | 375.66     |
| [27] | ExchQE    | ExchQL     | 341.51     |
| [28] | ExchQE    | ExchQL     | 310.46     |
| [29] | ExchQE    | ExchQL     | 282.24     |
| [30] | AutoA     | CashA      | 400.00     |
| [31] | BldEqyAMM | BldEqyAMI  | 39.60      |
| [32] | PensionLMI| PensionLMM | 18.18      |
| [33] | LeaseAMM  | LeaseAMI   | 40.34      |
| [34] | LeaseLMI  | LeaseLMM   | 40.34      |
| [35] | BondAMM   | BondAMI    | 45.28      |
| [36] | ExchQAMM  | ExchQAMI   | 2,250.70   |
| [37] | ExchQLMI  | ExchQLMM   | 611.19     |
| [38] | AutoAMI   | AutoAMM    | 133.33     |

Fig. 16A

2000 Income Statement

|  | [A] | [B] | [C] | [D] | [E] | [F] |
|---|---|---|---|---|---|---|
| [1] | Going Concern | | | | | |
| [2] | Operating Income | | | | | |
| [3] | Revenues | | | | | |
| [4] | RevMiscR | 1,000.00 | | | | |
| [5] | ExchQR | 24,757.74 | | | | |
| [6] | Total Revenues | | 25,757.74 | | | |
| [7] | Expenses | | | | | |
| [8] | PensionE | (200.00) | | | | |
| [9] | ExchQE | (6,723.09) | | | | |
| [10] | Total Expenses | | (6,923.09) | | | |
| [11] | Total Operating Income | | | 18,834.66 | | |
| [12] | Market Income (Expected) | | | | | |
| [13] | Asset Appreciations | | | | | |
| [14] | BldEqyAMI | 39.60 | | | | |
| [15] | LeaseAMI | 40.34 | | | | |
| [16] | BondAMI | 45.28 | | | | |
| [17] | ExchQAMI | 2,250.70 | | | | |
| [18] | Total Asset Appreciations | | 2,375.94 | | | |
| [19] | Asset Depreciations | | | | | |
| [20] | AutoAMI | (133.33) | | | | |
| [21] | Total Asset Depreciations | | (133.33) | | | |
| [22] | Favorable Liability Depreciations | | | | | |
| [23] | Total Liability Depreciations | | | | | |
| [24] | Unfavorable Liability Appreciations | | | | | |
| [25] | PensionLMI | (18.18) | | | | |
| [26] | LeaseLMI | (40.34) | | | | |
| [27] | ExchQLMI | (611.19) | | | | |
| [28] | Total Liability Appreciations | | (669.72) | | | |
| [29] | Total Market Income | | | 1,572.89 | | |
| [30] | Net Income (Total Going Concern Income) | | | | 20,407.55 | |

Fig. 16B

2000 Income Statement

|  | [A] | [B] | [C] | [D] | [E] | [F] |
|---|---|---|---|---|---|---|
| [30] | Net Income (Total Going Concern Income) | | | | 20,407.55 | |
| [31] | | | | | | |
| [32] | Market Moves | | | | | |
| [33] | Asset Gains | | | | | |
| [34] | LeaseAMM | 403.44 | | | | |
| [35] | AutoAMM | 133.33 | | | | |
| [36] | Total Asset Gains | | 536.77 | | | |
| [37] | Asset Losses | | | | | |
| [38] | BldEqyAMM | (39.60) | | | | |
| [39] | BondAMM | (45.28) | | | | |
| [40] | ExchQAMM | (2,250.70) | | | | |
| [41] | Total Asset Losses | | (2,335.59) | | | |
| [42] | Favorable Liability Gains | | | | | |
| [43] | PensionLMM | 18.18 | | | | |
| [44] | ExchQLMM | 611.19 | | | | |
| [45] | Total Liability Gains | | 629.37 | | | |
| [46] | Unfavorable Liability Losses | | | | | |
| [47] | LeaseLMM | (403.44) | | | | |
| [48] | Total Liability Losses | | (403.44) | | | |
| [49] | Total Market Moves Income | | | | (1,572.89) | |
| [50] | | | | | | |
| [51] | Total Comprehensive Income | | | | | 18,834.66 |

Fig. 17

2000 Balance Sheet

|  | [A]<br>Account | [B]<br>Assets | [C]<br>Liabilities |
|---|---|---|---|
| [1] | CashA | 95,800.00 | |
| [2] | BldEqyA | 4,000.00 | |
| [3] | PensionL | | 200.00 |
| [4] | LeaseA | 443.78 | |
| [5] | LeaseL | | 443.78 |
| [6] | BondA | 800.00 | |
| [7] | ExchQA | 24,757.74 | |
| [8] | ExchQL | | 6,723.09 |
| [9] | AutoA | 400.00 | |
| [10] | Shareholder Equity | | 118,834.66 |
| [11] | Total | 126,201.53 | 126,201.53 |

Fig. 18A

LeaseA Valuation Update

|  | [A]<br>Period | [B]<br>Future Value | [C]<br>Discount Factor | [D]<br>Present Value |
|---|---|---|---|---|
| [1] | 2001 | 140.00 | 1.00 | 140.00 |
| [2] | 2002 | 140.00 | 0.91 | 127.27 |
| [3] | 2003 | 140.00 | 0.83 | 115.70 |
| [4] | 2004 | 140.00 | 0.75 | 105.18 |
| [5] | | | | |
| [6] | Net Present Value | | | 488.16 |

Fig. 18B

LeaseA Valuation Update

|  | [A]<br>Period | [B]<br>Future Value | [C]<br>Discount Factor | [D]<br>Present Value |
|---|---|---|---|---|
| [1] | 2001 | 210.00 | 1.00 | 210.00 |
| [2] | 2002 | 210.00 | 0.91 | 190.91 |
| [3] | 2003 | 210.00 | 0.83 | 173.55 |
| [4] | 2004 | 210.00 | 0.75 | 157.78 |
| [5] | | | | |
| [6] | Net Present Value | | | 732.24 |

Fig. 19

2001 Credits and Debits

|  | [A] Debit | [B] Credit | [C] Amount |
|---|---|---|---|
| [1] | ExchQL | ExchQLMM | 5,000.00 |
| [2] | ExchQLMM | ExchQL | 4,545.46 |
| [3] | PensionLMM | PensionL | 20.00 |
| [4] | LeaseA | LeaseAMM | 44.38 |
| [5] | LeaseLMM | LeaseL | 44.38 |
| [6] | ExchQA | ExchQAMM | 2,475.77 |
| [7] | ExchQLMM | ExchQL | 626.85 |
| [8] | BldEqyA | BldEqyAMM | 50.00 |
| [9] | BondAMM | BondA | 10.00 |
| [10] | PensionLMM | PensionL | 80.00 |
| [11] | PensionE | PensionL | 200.00 |
| [12] | CashA | BldEqyAMM | 330.00 |
| [13] | CashA | BondAMM | 55.28 |
| [14] | BldEqyAMM | CashA | 125.00 |
| [15] | LeaseA | LeaseAMM | 70.00 |
| [16] | LeaseA | LeaseAMM | 63.64 |
| [17] | LeaseA | LeaseAMM | 57.85 |
| [18] | LeaseA | LeaseAMM | 52.59 |
| [19] | ExchQL | CashA | 4,500.00 |
| [20] | ExchQL | ExchQLMM | 500.00 |
| [21] | ExchQAMM | ExchQA | 225.79 |
| [22] | AutoAE | AutoA | 15.00 |
| [23] | LeaseAE | LeaseA | 210.00 |
| [24] | LeaseL | CashA | 140.00 |
| [25] | CashA | RevMiscR | 6,500.00 |
| [26] | CashA | CashAMM | 546.00 |
| [27] | BldEqyAMM | BldEqyAMI | 40.10 |
| [28] | PensionLMI | PensionLMM | 45.46 |
| [29] | LeaseAMM | LeaseAMI | 47.48 |
| [30] | LeaseLMI | LeaseLMM | 31.65 |
| [31] | BondAMM | BondAMI | 44.72 |
| [32] | ExchQAMM | ExchQAMI | 2,455.25 |
| [33] | ExchQLMI | ExchQLMM | 172.31 |
| [34] | AutoAMI | AutoAMM | 128.33 |
| [35] | CashAMM | CashAMI | 1,930.71 |

Fig. 20A

2001 Income Staement

| | [A] | [B] | [C] | [D] | [E] | [F] |
|---|---|---|---|---|---|---|
| [1] | Going Concern | | | | | |
| [2] | Operating Income | | | | | |
| [3] | Revenues | | | | | |
| [4] | RevMiscR | 6,500.00 | | | | |
| [5] | ExchQR | - | | | | |
| [6] | Total Revenues | | 6,500.00 | | | |
| [7] | Expenses | | | | | |
| [8] | PensionE | (200.00) | | | | |
| [9] | ExchQE | - | | | | |
| [10] | AutoAE | (15.00) | | | | |
| [11] | LeaseAE | (210.00) | | | | |
| [12] | Total Expenses | | (425.00) | | | |
| [13] | Total Operating Income | | | 6,075.00 | | |
| [14] | Market Income (Expected) | | | | | |
| [15] | Asset Appreciations | | | | | |
| [16] | BldEqyAMI | 40.10 | | | | |
| [17] | LeaseAMI | 47.48 | | | | |
| [18] | BondAMI | 44.72 | | | | |
| [19] | ExchQAMI | 2,455.25 | | | | |
| [20] | CashAMI | 1,930.71 | | | | |
| [21] | Total Asset Appreciations | | 4,518.25 | | | |
| [22] | Asset Depreciations | | | | | |
| [23] | AutoAMI | (128.33) | | | | |
| [24] | Total Asset Depreciations | | (128.33) | | | |
| [25] | Favorable Liability Depreciations | | | | | |
| [26] | Total Liability Depreciations | | - | | | |
| [27] | Unfavorable Liability Appreciations | | | | | |
| [28] | PensionLMI | (45.46) | | | | |
| [29] | LeaseLMI | (31.65) | | | | |
| [30] | ExchQLMI | (172.31) | | | | |
| [31] | Total Liability Appreciations | | (249.41) | | | |
| [32] | Total Market Income | | | 4,140.50 | | |
| [33] | Net Income (Total Going Concern Income) | | | | 10,215.50 | |

Fig. 20B

2001 Income Staement

| | [A] | [B] | [C] | [D] | [E] | [F] |
|---|---|---|---|---|---|---|
| [33] | Net Income (Total Going Concern Income) | | | | 10,215.50 | |
| [34] | | | | | | |
| [35] | Market Moves | | | | | |
| [36] | Asset Gains | | | | | |
| [37] | LeaseAMM | 240.98 | | | | |
| [38] | BldEqyAMM | 214.90 | | | | |
| [39] | BondAMM | 0.56 | | | | |
| [40] | AutoAMM | 128.33 | | | | |
| [41] | Total Asset Gains | | 584.78 | | | |
| [42] | Asset Losses | | | | | |
| [43] | ExchQAMM | (205.26) | | | | |
| [44] | CashAMM | (1,384.71) | | | | |
| [45] | Total Asset Losses | | (1,589.98) | | | |
| [46] | Favorable Liability Gains | | | | | |
| [47] | ExchQLMM | 500.00 | | | | |
| [48] | Total Liability Gains | | 500.00 | | | |
| [49] | Unfavorable Liability Losses | | | | | |
| [50] | LeaseLMM | (12.73) | | | | |
| [51] | PensionLMM | (54.55) | | | | |
| [52] | Total Liability Losses | | (67.27) | | | |
| [53] | Total Market Moves Income | | | | (572.47) | |
| [54] | | | | | | |
| [55] | Total Comprehensive Income | | | | | 9,643.03 |

Fig. 21

| | [A]<br>Account | [B]<br>Assets | [C]<br>Liabilities |
|---|---|---|---|
| [1] | CashA | 98,466.28 | |
| [2] | BldEqyA | 4,050.00 | |
| [3] | PensionL | | 500.00 |
| [4] | LeaseA | 522.24 | |
| [5] | LeaseL | | 348.16 |
| [6] | BondA | 790.00 | |
| [7] | ExchQA | 27,007.73 | |
| [8] | ExchQL | | 1,895.39 |
| [9] | AutoA | 385.00 | |
| [10] | Shareholder Equity | | 128,477.69 |
| [11] | Total | 131,221.25 | 131,221.25 |

FINANCIAL ACCOUNTING METHODS AND SYSTEMS TO ACCOUNT FOR ASSETS AND LIABILITIES

CROSS REFERENCE TO RELATED APPLICATIONS

The present application claims priority to Provisional Patent Application, Methods and Systems To Account and Report Assets and Liabilities As Present Values, Fluctuations and Value Trends, Ser. No. 60/708,683 filed on Aug. 16, 2005.

The present application also claims priority to Provisional Patent Application, Methods and Systems To Account and Report Assets and Liabilities As Present Values, Fluctuations and Value Trends, Ser. No. 60/706,931 filed on Aug. 10, 2005.

The following two papers, written by the present inventor, are hereby incorporated in their entirety by reference:

"FASB and the IASB versus J. R. Hicks" in Research in Accounting Regulation (2005), Vol. 18, p. 331-334; and shall be referenced herein as RAR1;

"How FASB and the IASB Should Apply Hicksian Theory to Calculate Income" in Research in Accounting Regulation (2005), Vol. 18, p. 335-349; and shall be referenced herein as RAR2.

In the event that there is a conflict between RAR1, RAR2, the Provisional Patent Applications, or the present specification, the present specification shall govern.

BACKGROUND TECHNICAL FIELD

The present invention regards financial accounting methods and computer systems to account for assets and liabilities in a double-entry bookkeeping framework based upon credits and debits.

COPYRIGHT NOTICE

This application includes a computer program source code listing written in C++ for Microsoft Visual C++, Version 6.0, Visual Studio.

This computer program source code listing is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND DESCRIPTION OF PRIOR ART

Today, accounting is in crisis. Most financial analysts question the appropriateness and relevance of GAAP (Generally Accepted Accounting Procedures) and are clamoring for transparency in financial statements. Because of the numerous deficiencies in GAAP, many companies prepare non-standard pro forma income statements in order to serve investor needs for useful financial data. Many investors dismiss accounting income and instead focus on cash flow. The recent spectacular collapses of Enron, WorldCom, and others are attributed, in part, to a failure of accounting to accurately represent financial reality. As a result of these collapses, the U.S. Congress passed the Sarbanes-Oxley Act and as a result of that, the SEC has recently identified three controversial off-balance sheet items for accounting to address: pensions, leases, and consolidations (between entities). The SEC also wants to use technology to improve information disclosure by public companies in order to serve the public markets. Last year, standards setters in the U.S. (FASB—The Financial Accounting Standards Board) and internationally (IASB—The International Accounting Standards Board) started a major multi-year "concepts" project to develop a framework to be used as the basis for future accounting standards. Unfortunately, this framework, as it presently stands, will lead accounting back into the nineteenth century.

Major factors contributing to the current accounting crisis have been the inadequacies of, and confusion between, two very different conceptual views of accounting in general, and income in particular. As shown in FIG. 1, the "Asset and Liability View" on the left existed in the nineteenth century; the "Going-concern Earning-power View"/"Revenue and Expense View" was first developed in the early twentieth century. The Asset and Liability View—currently a.k.a. Fair Value accounting—considers income to be the change in net assets, which is termed "Comprehensive Income." Comprehensive income was calculated in the U.S. in the late nineteenth century by the nation's most important industry, the U.S. railroads, which were pioneers in financial reporting.

At the start of the twentieth century, investors complained that comprehensive income failed to provide much insight regarding how much income companies were capable of generating on an ongoing basis. Investors wanted, what is termed here, a Going-concern Earning-power View of income. To meet this need, accounting developed the Revenue and Expense View of income, which became the almost exclusive view of income in the twentieth century. Under this view, income is calculated by matching current period transaction revenues and expenses and then noting the difference between the two as net income. Under a strict Revenue and Expense View, asset and liability values are based upon historic costs/values that are assumed to be constant, ignoring market trends and fluctuations. The Revenue and Expense View is a.k.a. matching and historic costing.

As has been known for decades, recording asset and liability values at historic costs/values and assuming that they remain constant seriously undermines the validity of both the income statement and the balance sheet. As an example, an increasing value of real estate that a business owns is not reflected in either the balance sheet or the income statement. While for the past several decades accounting, on an ad hoc basis, has employed smoothing and allocations to include some asset and liability values changes as part of revenues and expenses, the results are generally deemed highly suspect. As an example, under current GAAP, a year's changes in pension liabilities are spread across the calculated net income of multiple years by using a complex "earnings smoothing" formula. Such a formula, however, hides the economic reality: in the year the change occurred, the magnitude is muted; in the subsequent years, net income value is distorted by embedding some of the previous year's value change.

As a result of disillusion with the Revenue and Expense View of income, both the FASB and the IASB have gradually shifted accounting towards an Asset and Liability View of income determination. Their progress has been slow, but their intention is made plain in their joint May 2005 paper, "Revisiting the Concepts—A New Conceptual Framework Project." Perhaps they see no better alternative, but the result is to move accounting practice back to the nineteenth century and abandon the "Going concern Earning Power" income measurement that investors needed in 1900 and still need today. Accounting will move away from the improvements that the Going-concern Earning-power View introduced, without gaining relevance that is needed.

That investors need a "Going-concern Earning-power" income measurement is reflected in a recent statement by Wolfgang Reichenberger, the CFO of Nestle, the Swiss food giant:

> Analysts are interested in a number that is as close as possible to what management has achieved, what the company can do in the future and a guide to what can be distributed to shareholders. (*Financial Times*, Jun. 13, 2005)

It is also reflected in a classic article by Fischer Black of the famed Black-Scholes Option Valuation Formula:

> Users of financial statements—analysts, stockholders, creditors, managers, tax authorities and even economists—really want an earnings figure that measures value, not the change in value [comprehensive income]. Analysts, for example, want an earnings number they can multiply by a standard price-earnings ratio to arrive at an estimate of the firm's value. (*Financial Analysts Journal*, November-December 1980, p. 19-24)

In the article, Black essentially extols the "Going Concern Earning Power View" of income and suggests a theoretical means to test different accounting rules, but fails to offer any concrete prescriptions.

Nobel Laureate Economist J. R. Hicks' book *Value and Capital*, second edition published in 1946, is perhaps the most theoretically authoritative work on income measurement. It is the only authority that the FASB and the IASB cite in their May 2005 paper "Revisiting the Concepts—A New Conceptual Framework Project" in which Hicks is cited to support the Asset and Liability View of income. However, as argued by Bromwich, Macve, and Sunder ("FASB/IASB Revisiting the Concepts: a comment on Hicks and the concept of 'income' in the conceptual framework") and Jameson ("FASB and the IASB versus J. R. Hicks" in *Research in Accounting Regulation* (2005), Vol. 18, p. 331-334.), J. R. Hicks actually supports the Going-concern Earning-power View of income. Specifically, Hicks states:

> The purpose of income calculations in practical affairs is to give people an indication of the amount which they can consume without impoverishing themselves. Following out this idea, it would seem that we ought to define a man's income as the maximum value which he can consume during a week, and still expect to be as well off at the end of the week as he was at the beginning. Thus, when a person saves, he plans to be better off in the future; when he lives beyond his income, he plans to be worse off. Remembering that the practical purpose of income is to serve as a guide for prudent conduct, I think it is fairly clear that this is what the central meaning must be. (p. 172)

Though Hicks offers a general prescription for accounting practice, he fails to provide concrete prescriptions. Ajit Zacharias ("A Note on the Hicksian Concept of Income") considers Hicks's work as it might apply to national accounts, but concludes:

> There is really no Hicksian concept of income (at least in *Value and Capital*) that could be used as a theoretical starting point for building a system of income accounting.

Besides current difficulties with accounting for asset and liability value changes and the intention to revert back to the Asset and Liability View of income, accounting today is also plagued by an inability to directly embrace present value analysis, a pillar of financial theory and practice.

As an example of present value analysis, suppose that a company is to receive $2.50 (yearly payment) each year into perpetuity and has an expected rate of return of 10% (r). Assuming that the payment starts immediately, slightly modifying the standard valuation formula because of the immediate first payment yields:

$$presentValue = \sum_{t=0}^{t=\infty} yearlyPayment/(1+r)^t = 27.50 \quad (\text{EQ 1})$$

Such a present value of $27.50 could be entered as a single credit or debit into any accounting system today, but the flow, management, and discounting-summation of the $2.50 payments could not be. Perhaps most importantly, because the current accounting theory does not support present value calculation, such calculation is performed outside of the credit and debit control that an accounting paradigm could potentially offer. It would be desirable to include present value calculation within accounting itself.

Finally, current accounting theory, computer systems, and practice fail to embrace the concept of mathematical expectation, and thus forgo precision. If, for example, a company has a potential contingent tax liability of $1000, under current GAAP, either the full $1000 is recognized or it is not recognized. Such an approach is too binary. It would be more accurate to assign a probability to the potential contingent liability, say 35%, and then book $350 as the mathematically expected liability. However, current accounting theory, computer systems, and practice are unable to handle such superior precision. Furthermore, current accounting handles transactions that have long-term sales cycles poorly, because the potential revenue is not recognized until the contract is signed. In this case, if the expected value of a potential contract were included in the accounts as the contract looked evermore promising, then "economic reality" would be more accurately represented.

SUMMARY OF THE INVENTION

Accordingly, besides the objects and advantages of the present invention described elsewhere herein, the objects and advantages of the present invention are to develop a financial accounting method to account for asset and liability value changes so as to provide a genuine Going-concern Earning-power View income. This is accomplished while simultaneously supporting an Asset and Liability View of income and embracing the currently existing double entry bookkeeping paradigm of credits and debits.

Specifically, the object is an income statement as shown in FIG. 2 in which going-concern earning power income is subtotaled as net income. This subtotal consists of both operating income and what is termed here as Market Income, which is a present value of the mathematically expected appreciation and depreciation of assets and liabilities. The Market Moves section of the income statement reports the gains and losses of assets and liabilities. Net income plus Market Moves income equals comprehensive income. Thus the present invention also supports the Asset and Liability View of income, in addition to the Going-concern Earning-power View of income.

The object is also a balance sheet as shown in FIG. 3, in which assets and liability values are based upon either present values or current market values.

Still other additional objects include:

Developing a method to account for currently off balance-sheet items, specifically: pensions, leases, and consolidations;

Developing a method to integrate present value calculation into a double entry bookkeeping system wherein said credits and debits provide a control check;

Developing a method to integrate within accounting theory and practice mathematical-expectation based entries.

Yet additional objects and advantages will become apparent from a consideration of the ensuing description and drawings.

The basis for achieving these objects and advantages, which will be rigorously defined hereinafter, is accomplished by programming one or more computer systems as disclosed. The present invention can operate on most, if not all, types of computer systems. A computer system, programmed as disclosed herein, constitutes one embodiment of the present invention.

BRIEF DESCRIPTION OF THE DRAWINGS

The invention will be more readily understood with reference to the accompanying drawings, wherein:

FIG. 1 shows the Asset and Liability View versus the Going-concern Earning-power View of accounting and income measurement against a time axis;

FIG. 2 shows a general income statement generated by the present invention;

FIG. 3 shows a simple balance sheet generated by the present invention;

FIG. 5 shows the basic eight types of accounts used by the present invention;

FIG. 7 shows the high-level elements of the present invention;

FIG. 8 shows the operation of PostFFT, which manages future debit and future credit postings;

FIG. 11 provides raw data regarding ExchQ, a potential or actual contract;

FIG. 12 shows the Asset and Liability Table;

FIG. 13 shows the Scenario Probability Table;

FIG. 14 shows the Future Flow Table;

FIG. 15 shows credits and debits generated in 2000 by the extended example;

FIGS. 16A and 16B show the 2000 income statement for the extended example;

FIG. 17 shows the 2000 balance sheet for the extended example;

FIGS. 18A and 18B show present value calculations regarding a lease;

FIG. 19 shows credits and debits generated in 2001 by the extended example;

FIGS. 20A and 20B show the 2001 income statement for the extended example;

FIG. 21 shows the 2001 balance sheet for the extended example.

DETAILED DESCRIPTION OF THE INVENTION

Introduction

Figures 4, 6:
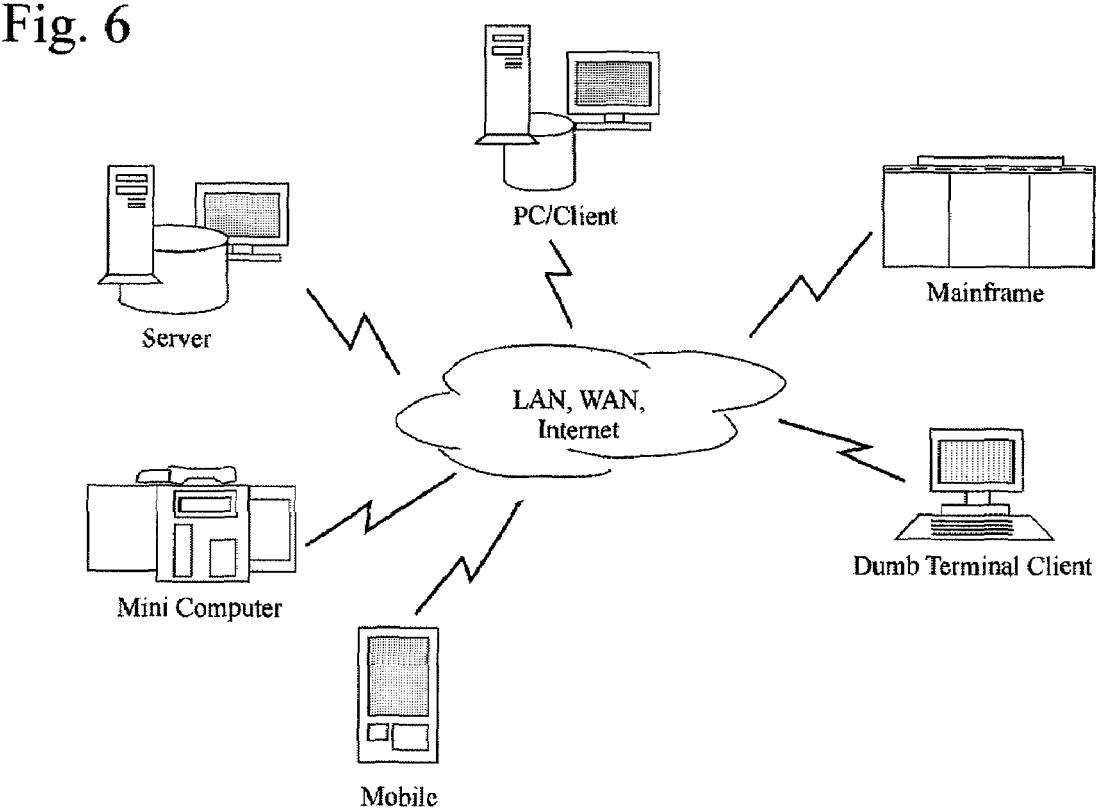
FIG. 4 shows the basis that the Asset and Liability View, the Revenue and Expense View, and the present invention's Going-concern Earning-power View employ to determine both balance sheet and income statement entries.
FIG. 6 shows a possible computer system on which the present invention can operate.

In the second section below, preliminary definitions and nomenclature are presented. In the third section, the theory of the invention is presented. In the fourth section, implementation and operation is demonstrated by use of an "extended example" covering two accounting periods. In the fifth section, source code that demonstrates key aspects of operation is introduced. In the sixth and last section, miscellaneous considerations are discussed.

This teaching is accomplished in part by presenting an extended numerical example covering two accounting periods, years 2000 and 2001. This example is only illustrative, and should not be construed to in any way limit or bind the interpretive scope of the present invention. Tables shown use a spreadsheet format in order to facilitate exposition. In an actual implementation of the present inventions, spreadsheets may or may not be utilized.

Preliminary Definitions and Nomenclature

The capitalized term "Company" shall refer to the entity for whose accounts and financial statements are under the management of the present invention. The Company can be a for-profit business, but it could also be a non-profit, non-government agency, government, government agency, cooperative, partnership, family, individual or other legal entity.

The capitalized term "User" shall refer to a person, or computer system, who operates the present invention on behalf of the Company.

The capitalized term "Consumers" shall reference entities that use the financial statements generated by the present invention and/or that review the data managed by the present invention. Investors are the primary Consumers, though Consumers includes all other stakeholders, including government regulators and creditors.

The Company, User, and Consumer can all be the same entity, such as when an individual uses the present invention for individual use. The Company is a Consumer when it uses the results of the present invention. The terms "Company" and "User" are used interchangeably when a distinction is not needed.

The "Ex Ante Equation" is derived and defined in RAR2 as Equation 9 on page 338 of that document. It can be derived from the Equation 1 of the present document.

Both Equation 1 and the Ex Ante Equation use the same "r", which is an abbreviation for return. The Company is assumed to have a standard r used for present value analysis and such an r is termed "Company-r." In the extended example, Company-r equals 0.10. Naturally, any Company that implements the present invention sets Company-r as deemed appropriate.

For convenience in the extended example, accounting periods span years and start with Year 2000. The time-period unit of r and Company-r needs equal accounting period length.

Rather than using account numbers, to facilitate ease of comprehension, this disclosure uses account names. Standard accounts—assets, liabilities, revenues, and expenses—have capitalized suffixes "A", "L", "R" and "E" as part of their names. The present invention introduces and uses two new types of accounts: Market Income and Market Moves. These types of accounts have "MI" and "MM" as suffixes respectively. Conceptually, each asset and each liability account has an associated Market Income and Market Moves account, but this is not a strict implementation requirement, since an asset or liability account can have no associated Market Income or Market Moves account. Market Income accounts associated with assets and liabilities have suffixes of "AMI" and "LMI" respectively; Market Moves accounts associated with assets and liabilities have suffixes of "AMM" and "LMM" respectively;

a "Position" account is an asset or liability account.

an "Income" account is a revenue, expense, Market Income, or Market Moves account.

"A/L" is an abbreviation for "asset/liability".

A "future flow" or simply "flow" can be a cash-flow, but it can also be a flow of resources, the value of which is based upon accounting values. So, for instance, if the Company rents out a machine, the flow-out is the depreciation cost resulting from the usage by the counter-party. The flow-in might be the periodic cash payments made by the counter-party. It could also be the value assigned to resources that the counter-party provides in exchange for the machine use.

Theory of the Invention

Ex Ante Equation

The basic theory of the present invention is provided in RAR2, which shows the derivation and basic use of the Ex Ante Equation, which is Equation 9 on page 338 of that paper. The Ex Ante Equation is a creative result of the present invention.

The beauty of using the Ex Ante Equation for accounting purposes is that it unifies accounting theory and practice with financial theory and practice. Using the variable names of Equation 1 of the present document, the Ex Ante Equation is thus defined as:

$$yearlyPayment = presentValue(1 - 1/(1+r)) \quad (EQ2)$$

Inserting the previously obtained present value of $27.50 and r of 0.10 yields the following:

$$27.50(1 - 1/(1+0.1)) = 2.50 = yearlyPayment \quad (EQ3)$$

in particular, the original yearly payment of $2.50. Equation 2 can be algebraically derived from Equation 1 and vice-a-versa. In both equations, r is the usual expected rate of return.

The Ex Ante Equation is used to determine what is termed "Market Income", based upon the present value of an asset or liability. For some assets and liabilities, market value is used instead of present value, because market value is the market's assessment of the present value of the future stream of costs and benefits that are associated with the asset or liability.

A further beauty of the Ex Ante Equation is that it yields going-concern earning-power income. Suppose that the previously used $27.50 represents the full value of Company. If $2.50 were paid as dividends, the value of Company would drop to $25.00, but given the 10% return, its value would raise back to $27.50 at the end of the next period. Thus the Company is perfectly positioned to continuously pay a $2.50 dividend at the end of each period. This $2.50 income is exactly the object of the Going-concern Earning-Power View of income determination. It satisfies the CFO of Nestle by showing "what management has achieved, what the company can do in the future and [providing] a guide to what can be distributed to shareholders". It satisfies Fischer Black's challenge, because the $2.50 can be multiplied by the inverse of the return, i.e. 10, in order to obtain Company value. It satisfies Hicks prescription, because it gives a perfect indication of what can be consumed without leading to poverty. Because the Ex Ante Equation yields going-concern earning-power income, it is central to the present invention.

The r for the Ex Ante Equation can be estimated using several methods. For many assets and liabilities, in particular those defined as flows or cash flows, the same r that is used for the present value calculations can (and should be) used in the Ex Ante Equation. For publicly traded bonds, r equals the expected return. For other assets and liabilities, prior-art statistical techniques, especially those techniques used in financial-derivative and pension-scenario modeling, can be used to estimate r. As a simple last resort, r can be set equal to the current interest rate—an approximation method used by Adam Smith, the eighteenth century founder of economics, to estimate expected return.

Comparison of Accounting Views

To understand the present invention and its benefits over the Asset and Liability View and the Revenue and Expense View of accounting, it can be helpful to consider an accounting framework capable of executing all three accounting views. Such a framework has three types of balance sheet entries as shown in FIG. 4: entries based upon historic cost (Row 1), entries based upon present value (Row 2), and entries based upon market value (Row 3). Such a framework also has four types of income statement entries: entries based upon the change in asset and liability account values (Column 1), entries based upon smoothing and allocating asset and liability changes (Column 2), entries based upon operations (Column 3), and entries based upon the Ex Ante Equation (Column 4).

With this framework, it is easy to compare the three views of accounting. The ideal of the Asset and Liability View is to operate in Cells C21 and C31 of FIG. 4, where balance sheet entries equal present and market values, and where income statement entries equal the net change in asset and liability account values. The ideal of the Revenue and Expense View is to operate in Cell C13, where balance sheet entries are based upon historic cost and where income statement entries are based upon operations. Since the ideal of the Revenue and Expense View is not realized in practice, it also operates in Cells C12, C22, and C32 in order to account for asset and liability value changes. The ideal of the Asset and Liability View is not likely to be realized in practice; as a functional matter, it too will operate in Cells C12, C22, and C32, as foreshadowed by the recent announcements by FASB regarding their plan to develop smoothing operators for pension accounting in 2007. As a practical matter also, the Asset and Liability View also will operate in Cells C13, C23, and C33.

The ideal for the present invention is to operate in Cells C23, C24, C33, and C34. Balance sheet values are based upon present and market values. Income statement entries are based upon operations and the Ex Ante Equation. As a practical matter, the present invention may also partially operate in Cells C13 and C14, due to difficulty in determining current values for some assets and liabilities. In contrast to both the Asset and Liability View and the Revenue and Expense View of accounting however, the present invention directly focuses upon estimating Going-concern Earning-power net income. The approximations and distortions of smoothing and allocations of the Revenue and Expense View are circumvented; and Going-concern Earning-power net income is estimated, rather than dismissed, as is the case with the Asset and Liability View of income.

FIG. 4 brings to the fore an important consideration for the present invention regarding alternative approaches to handling the same asset or liability. If, for example, the asset in question is a bond, should the balance sheet value be the market value or the present value of the future payments using Company-r in Equation 1? And similarly, should the Ex Ante Equation be applied with r equal to the current yield of the bond, or with r equal to Company-r? Of the four possibilities:

| | |
|---|---|
| balance sheet value = market price | r = current yield |
| balance sheet value = market price | r = Company-r |
| balance sheet value = present value | r = current yield |
| balance sheet value = present value | r = Company-r | the present inventor believes that the first is superior, that the balance sheet entry should be based upon the current market price, and that r should be the current yield of the bond. The basis for this belief is that to consider present value and Company-r introduces abstraction beyond the usual initial orientation of most people. (The present invention can handle each of the four approaches, and thus one may select the approach deemed best.)

Types of Accounts

FIG. 5 shows the eight types of accounts used in the present invention. As in current accounting theory and practice, there are asset, liability, revenue, and expense accounts. In the contexts of the present invention, these accounts are used as they are currently used, except that changes in asset and liability values are posted to the Market Moves accounts, rather than the expense and revenue accounts. The results of the Ex Ante Equation are posted to the market moves accounts, and offsets are posted to the Market Income accounts, which are rarely, if ever, directly accessed by the User. The LMI and LMM accounts are analogous to the expense accounts; the AMI and AMM accounts are analogous to the revenue accounts. (This structure complements, and works well with, the structure and symmetry of prior-art accounting.)

During an accounting period, the User makes four basic types of postings to Market Moves accounts:

If an asset value has increased, the asset account is debited and the corresponding asset Market Moves account is credited.

If an asset value has decreased, the asset account is credited and the corresponding asset Market Moves account is debited.

If a liability value has increased, the liability account is credited and the corresponding liability Market Moves account is debited.

If a liability value has decreased, the liability account is debited and the corresponding liability Market Moves account is credited.

If an asset or liability is created in an accounting period, a particular consideration might be warranted. If, for example, the Company signs a multi-year contract, the present value of the contract is calculated as shown below and is debited to an asset account. However, where should the credit be posted? There are two choices: a revenue account or a Market Moves account. The decision rests upon whether the contract is likely repeatable in the next period. If the contract is likely repeatable, then the credit should go to a revenue account, in order to reflect the judgement that a similar contract and value will be generated in the next period. If the contract is not repeatable, then the credit should go a Market Moves account. In placing the credit in the Market Moves account, the obtained asset value will appear on the income statement as part of Market Moves income. The "Going concern earnings power" income contribution of the contract will appear in the market income section of the income statement as a result of applying the Ex Ante Equation. Most importantly however, the full present value of the contract will not artificially inflate net income. Note that whether the credit is to revenue or Market Moves, the Market Income for the asset in the subsequent periods will be the same. Note also that the multi-year contract is ideally split into an asset and a liability, and each is handled as described below. It is not that they are handled differently—assets and liabilities are not fundamentally different, but rather mirror images of each other—but rather that they are handled separately.

A graduated scale can be used regarding whether the credit should be posted to a revenue or Market Moves account. The credit can be split between the two types of accounts, depending upon the estimated probability of repetition. If, for example, the estimated probability of repetition is 35%, then 35% of the credit can be posted to a revenue account and 65% posted to a Market Moves account.

Application of Ex Ante Equation

At the close of the accounting period, the Ex Ante Equation is applied to some or all asset and liability accounts. Since both assets and liabilities can have positive or negative expected returns, there are four basic types of Ex Ante Equation postings:

If an asset is expected to appreciate, it has a positive r, and the Ex Ante Equation yields a positive result. This positive result is debited to the Market Moves account and credited to the associated Market Income account.

If an asset is expected to depreciate, it has a negative r, and the Ex Ante Equation yields a negative result. The absolute value of the yielded result is credited to the associated Market Moves account and debited to the associated Market Income account.

If a liability is expected to favorably depreciate, it has a negative r, and the Ex Ante Equation yields a negative result. The absolute value of the yielded result is debited to the associated Market Moves account and credited to the associated Market Income account.

If a liability is expected to unfavorably appreciate, it has a positive r, and the Ex Ante Equation yields a positive result. This positive value is credited to the associated Market Moves account and debited to the associated Market Income account.

Ideally, the Ex Ante Equation is applied to each asset and each liability in order to obtain a measurement of what proportion of the asset can be consumed and what proportion of the liability needs to be replenished, to achieve the same net Market Income in the next period. The primary objective of the present invention is to determine a net income that can be paid to the shareholders as dividends, yet leave the Company positioned to mathematically expect the same net income in the next period.

At the end of the period, the balances of the revenue and expense accounts are used as the entries of the operating income section of the income statement. The balances of the Market Income accounts are used as the entries of the Market Income section of the income statement. As shown in FIG. 2, the sum of operating and Market Income equals net income. This net income is an estimate of "Going concern earnings power" income, i.e. "that which can be consumed, while leaving the Company positioned to be able to mathematically expect to have the same net income in the next period."

The balances of the Market Moves accounts are used as the entries of the Market Moves section, which when summed with net income yield comprehensive income. After the income statement has been generated, the balances of the Income accounts are swept into the shareholder equity account, in the same way that current accounting practice sweeps revenue and expense accounts into shareholder equity. Once finished, the balance sheet is generated. Though FIG. 5 does not show the shareholder equity account, it exists in the present invention and operates per prior-art theory and practice.

Relationship of Market Moves and Market Income Accounts

The application of the Ex Ante Equation moves embedded current income in asset and liability values from Market Moves to Market Income.

This advantageously leaves the Market Moves accounts revealing "pure" asset and liability value changes. This can be demonstrated by resuming the previous example where the value of the Company is $25.00 at the start of the period and assuming that the Company has a single asset. At the end of the period, the value of the Company is $27.50, since it appreciates 10%. The $2.50 is posted as a debit to the asset account and as a credit to Market Moves. When the Ex Ante Equation is applied, Market Moves is debited $2.50 and Market Income credited. In words, the $2.50 has moved from Market Moves to Market Income. This leaves a zero balance in the Market Moves account, indicating that there has been no change in the asset value of the Company.

If because of a random fluctuation the value of the Company increases to $29.00 in one period, Market Moves is credited $4.00 and the asset account is debited. When the Ex Ante Equation is applied, Market Income proves to be $2.64, which is debited to Market Moves and credited to Market Income. This leaves Market Moves with a 1.36 balance, indicating an increase in the asset value of the Company. That this is the increased value of the Company, assuming that the $2.64 is paid as dividends, is demonstrated by considering the Company's position. With a starting value of 26.36 (25.00+1.36), the expected value at the end of the next accounting period is $29.00 (26.36*1.1), when Market Income will again prove to be $2.64, which if paid, . . . .

Hence, not only is the present invention accurately measuring Going-concern earning-power income, it also accurately measuring changes in the net assets.

Relationship of Assets, Liabilities, and Operations

Generally, the present invention considers assets and liabilities separate and distinct from operations. Assets and liabilities are literally considered catalysts, in that they promote operations, but are unaffected by operations. The major basis for this assumption is that the Company can readily go to the market place to buy and sell resources (assets) and obligations (liabilities) as needed. The Company is thus effectively split into two parts: an operations part and an asset/liability holding part. The operation part is effectively assumed to transact with asset/liability holding part on a spot-market basis.

Asset Depreciation

Because it is no longer a pure catalyst for operations as discussed in the previous paragraph, some assets can require special handling. This special handling is best illustrated by assuming that the asset in question is an automobile. Automobiles depreciate both because of use and because of the passage of time. These two types of depreciation are handled separately by the present invention. The depreciation caused by use is handled per prior-art accounting theory and practice. So, for example, a charge of $0.15 per mile for automobile use might be built into the cost accounting subsystem. The depreciation caused by the passage of time is handled by the present invention as any other depreciating asset: a negative r is specified for the Ex Ante Equation.

By separating depreciation into two components—use and passage of time—asset depreciation is more accurately estimated. Furthermore, products and services can be more accurately costed, since the costs provided by the costing subsystem can avoid including the overhead, sunken cost that result from the passage of time. Finally, at anytime the automobile, or any other asset, can be marked-to-market or marked-to-present-value, thus making the balance sheet entry extremely accurate.

Affiliations, Subsidiaries, Mergers and Acquisitions

Conceptually, any asset, liability, or potential asset or liability can and should be on the balance sheet, and its associated market income included as part of net income. Accordingly, corporate subsidiaries, major contracts, and currently generally considered off-balance sheet items should be on the balance sheet with their associated Market Income on the income statement.

Given that current economic theory assumes that economic agents are rational, it follows that multiple agents will make the same decision in the same situation. The present inventor believes that issues of asset and liability control are not very relevant for valuation, and that asset and liability account valuation should not consider issues of control. Accordingly, the accounts of subsidiaries and joint-ventures should be included in the parent company's balance sheet and income statement on a pro-rata ownership-proportion basis.

When multiple companies merge, at the end of the first post merger period, all assets and liabilities should be marked-to-market and prices paid to affect the merger posted to Market Moves. The effect of the merger on pre-merger companies should be presented—by showing the proportional interests in the resulting Company by the originating companies. So, for example, the presentation might state that the resulting merged company represents 60% of pre-merge Company A and 40% of pre-merge Company B.

Implementation and Operation

The present invention can operate on most, if not all, types of computer systems. FIG. 6 shows a possible computer system, which itself is a collage of possible computer systems on which the present invention can operate. Note that the invention can operate on a stand-alone hand-held mobile computer, a stand-alone PC system, or an elaborate system consisting of mainframes, mini-computers, and servers—all connected via LANs, WANs, and/or the Internet. The invention best operates on a computer system that provides each individual user with a GUI (Graphical User's Interface) and with a mouse/pointing device, though neither of these two components is mandatory.

The computer system as shown in FIG. 6, or variations, requires proper programming to execute the present invention, though this readily accomplished given this teaching that includes computer program source code to execute and demonstrate key aspects of the present invention.

The major computer system components and basic user interactions are shown in FIG. 7. Box 701 is the essence of the present invention, which embeds a prior-art financial accounting system, Box 703. Not shown in Box 703 is a prior-art cost accounting subsystem, which is not required by the present invention, but which can be beneficially used in conjunction with the present invention in some circumstances. Six of the major components of the present invention are shown as free-standing text in Box 701. The User submits credits and debits that are posted to the prior-art and Market Moves accounts. The User also submits credits and debits via PostFFT (Post Future Flow Table). The User submits queries, e.g., to determine account balances, and obtains query results. The User also specifies data for the Asset and Liability and Scenario Probability Tables. The Asset and Liability Table lists assets and liabilities, the Position value basis, and associated rs for use by the Ex Ante Equation. The Scenario Probability Table defines probabilities for scenarios contain in the Future Flow Table.

Asset and liabilities can be defined as flows of current-period and future-period credits and debits. These credits and debits are handled by the previously mentioned PostFFT. Analogous to posting regular credit and debits, the User makes postings to PostFFT, which requires six parameters, as shown in the top of FIG. 8. Any individual posting is either a future debit posting or is a future credit posting. Since they operate similarly, a future debit positing will be used to illustrate. In this case, debitAccount is set equal to an asset or liability account that is, or will be, defined by entries in the Future Flow Table; debitScenario is a scenario name; creditAccount is the offset account; creditScenario is blank; futureDate and futureValue are self explanatory. The creditAccount is typically a Market Moves account, but could be any Position or Income account. The offsetting creditAccount is never an asset or liability account defined by the Future Flow Table. As shown in FIG. 8, PostFFT makes an entry in the Future Flow Table, such as shown in FIG. 14 Row 13. The present value of futureValue is calculated, then multiplied by the probability of debitScenario, and the final result is posted to debitAccount and creditAccount. This ends the illustration of a future debit posting. A future credit posting operates similarly, though with a reversal between credit and debit as described above.

Figures 9, 10A, 10B:
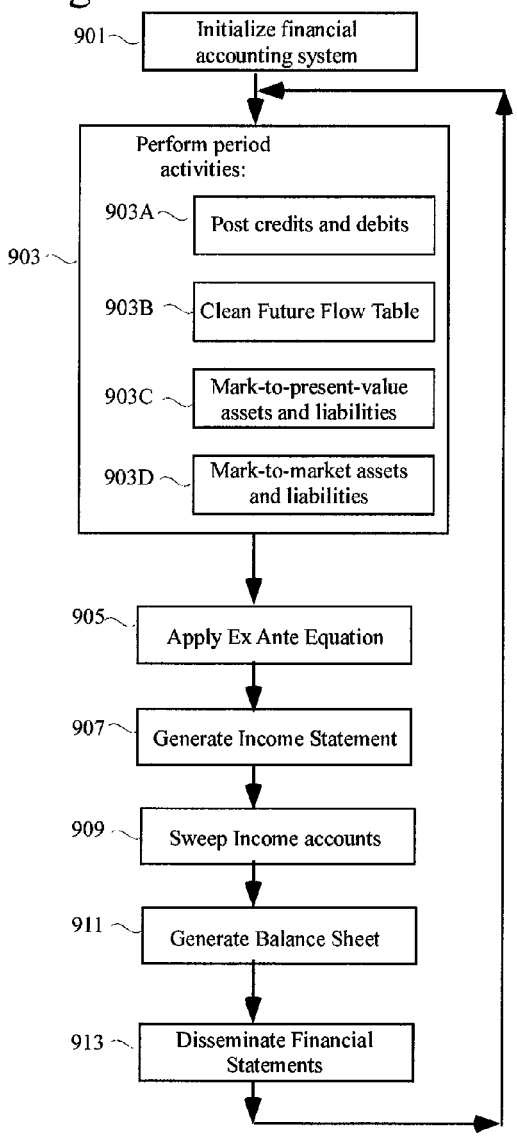
FIG. 9 shows the sequence of steps typically employed when using the present invention.
FIG. 10A lists the six accounts that are the focus of the extended example.
FIG. 10B shows the valuation basis for the six accounts and how their associated r is set.

FIG. 9 shows the sequence of steps that are executed to employ the present invention. Step 901 is usually done only once. Steps 903-913 are performed in the order shown in every accounting period. Step 903 consists of four substeps—903A, 903B, 903C, and 903D—which can be performed at any time and in any order. However, it is slightly preferable to perform Step 903B prior to performing Step 903C, because otherwise, the Future Flow Table may contain entries that are in need of updating, yet are used by Step 903C.

In order to highlight salient points and maintain consistency with RAR2, example executions of Steps 903-913 will be shown for two periods, Years 2000 and 2001. In order to facilitate ease of comprehension, the Company is formed late in 2000 and only select Steps are performed. In Year 2000, much of the initialization needed for Year 2001 occurs. All Steps of FIG. 9 are required for Year 2001, which is representative of the capability and functionality of the present invention.

The extended example will focus on six Position accounts as shown in FIG. 10A. FIG. 10B shows their valuation basis and the basis for their rs.

BldEqyA is a building or share of stock purchased by the Company. BldEqyA is the building in RAR2. It is handled here in the same way, whether it is a building or share of stock. PensionL is the same as the pension in RAR2. Lease and BondA are self-descriptive.

ExchQ is a potential or actual contract as defined by the flows shown in FIG. 11. ExchQ could be a financial derivative, a financial swap, a project for a customer, an internal project, or any other type of exchange in which a contingent or deterministic present value analysis is appropriate. It is easiest to consider the values as cash flows, but they could just as well be resource flows. ExchQ is split into two parts: an asset and a liability. The asset can be thought of as a revenue stream, and the liability as an expense stream. As shown in the figure, the asset is defined by two scenarios, with assigned probabilities. The liability is defined by a single scenario. Using standard present value analysis yields a net present value of $18,035. The purpose of ExchQ here is to illustrate the generalized use of the Future Flow Table, in which multiple probabilistic scenarios are employed.

The last item in FIG. 10A is an automobile, AutoA. AutoA depreciates both because of use, and because of the passage of time. In terms of use, depreciation is $0.15 per mile; in terms of depreciation because of the passage of time, depreciation is 25% per year.

In Step 901, the financial accounting system in FIG. 7, i.e. Box 701, is initialized. Empty Asset and Liability, Scenario Probability, and Future Flow tables are created with columns as respectively shown in FIGS. 12, 13, and 14. Depending upon the situation, initialization could be a full installation, in which case the prior-art financial accounting system (e.g. Oracle Financials) is also initialized, or it could be an installation of only the incremental capability as represented by the present invention. In either case, interfaces for PostFFT are developed.

Extended Example: Year 2000 Period

Initially, the shareholders contribute $100,000 in cash. Accordingly, as is in the prior-art, CashA is debited and shareholder equity credited, which is shown in FIG. 15, Row 1.

The Company purchases a building or a share of stock for $4000. Cash is credited and BldEqyA is debited. The value of r for BldEqyA is estimated to be 0.01. This is entered as shown in the Row 1 of the Asset and Liability Table of FIG. 12. Also indicated in the row is that the Position value is based upon the market value, i.e., the asset is mark-to-market.

The Company compensates its employees with a pension that will pay $518.75 in 2010. Assuming no uncertainty regarding both the amount and period of payment, a scenario and associated probability of 1.0 is entered in the Scenario Probability Table as shown in Row 1 of FIG. 13. Because the $518.75 is discounted using Company-r, its present value would be expected to appreciate by Company-r in each period. Hence, the liability PensionL is entered in the Asset and Liability Table as shown in Row 2 of FIG. 12, with r equal to Company-r. Also indicated in the row is that the Position value is based upon present value, i.e., the liability is mark-to-present value. Given these initializations, posting to PostFFT is done with:

```
debt = PensionE
debitScenario =
credit = PensionL
creditScenario = ScenarioPensionL
futureDate = 2010
futureValue = 518.75
```

PostFFT in turn posts the future debit to the Future Flow Table as shown in Row 1 of FIG. 14. Next, it calculates the present value of $518.75 as $200, and multiplies by the 1.0 of Cell C1 of FIG. 13. This $200 is debited to PensionE and credited to PensionL, as shown in Row 3 of FIG. 15.

Revenues of $1000 are posted as in the prior-art: debit CashA and credit RevMiscR.

At this point, if it were generated, the income statement would be as shown in Fig. 1B on page 340 of RAR2, with a slight change in labeling. The balance sheet would be slightly different because of different initial capitalization and a slight change in labeling.

The Company signs a four-year lease that starts in 2001. The terms of the lease require annual payments of $140. From the perspective of the present invention, an asset and liability have been created, both of which entail four future flows of $140. Accordingly, entries are made in the Asset and Liability Table as shown in Rows 3 and 4 of FIG. 12, where the Company-r is entered and the Position value basis is set equal to the present value. Rows 2-3 are entered in the Scenario Probability Table as shown in FIG. 13. Posting to PostFFT is done four times with:

```
debt = LeaseA
debitScenario = ScenarioLeaseA
credit = LeaseAMM
creditScenario =
futureDate =
futureValue = 140
``` where futureDate is interactively 2001, 2002, 2003, and 2004. Posting to PostFFT is also done four times with:

```
debt = LeaseLMM
debitScenario =
credit = LeaseL
creditScenario = ScenarioLeaseL
futureDate =
futureValue = 140
``` where futureDate is interactively 2001, 2002, 2003, and 2004. These eight calls to PostFFT result in Rows 2-9 of the Future Flow Table as shown in FIG. 14. They also result in accounts LeaseA and LeaseL having balances of $443.77, the present value of four annual payments of $140 starting in 2001.

The Company buys a bond for $800 that has a yield of 6%. Naturally, per the prior-art, this results in a debit to account BondA and a credit to CashA. In addition, however, for the present invention, an entry is also made in the Asset and Liability Table as shown in FIG. 12, Row 5. (This bond could also be handled as a future flow, but as a suggested previously, this is not considered desirable. As a future flow, the future receipts from the bond—both coupon interest payments and payment of the original principal—are posted to the Future Flow Table. The account asset value is set equal to the present value of the flow, with r equal to Company-r (0.10) or the bond yield (0.06). With r equal to 0.10, the present value of the bond is lower than the market price, and this difference is posted as a debit to the market moves account and a credit to the asset account. As discussed previously, this is deemed less desirable than how the bond is handled in the extended example.)

The Company signs a contract for ExchQ as shown in FIG. 11. Given the three scenarios, their associated probabilities of occurrence are entered in the Scenario Probability Table as shown in Rows 4-6 of FIG. 13. ExchQA and ExchQL are entered in the Asset and Liability Table as shown in FIG. 12, Rows 6-7.

The User may intentionally set the probabilities for all scenarios of a given account to sum to less than 1.0, because unspecified scenarios might be irrelevant and because of a mathematical expected value perspective. So for example, rather than initially setting the probabilities of scenarios ScenarioFlowIn1 and ScenarioFlowIn2 to sum to 1.0, the User might initially set the probabilities to sum to 0.20, and then as the scenarios looked more (or less) promising, adjust the probabilities. This approach is particularly effective means to implement a gradual recognition of a potential sale that entails long a sales process: at the start of the process, the probability might be set low at 0.05. During the process, as things evolve, the probability is raised or lowered depending upon estimated prospects.

Prior to posting ExchQ, a judgement is made as to whether ExchQ is repeatable. A contract is repeatable only if there is a reasonable expectation that a similar contract will manifest, and can be handled, in the next period. So for example, consider a homebuilder who builds residential houses. If the homebuilder signs a contract to build a home and if the homebuilder reasonably expects to sign a similar contract in the next period, then the contract is repeatable. If the homebuilder lacks manpower capacity to serve a similar contract that could be signed in the next period, or if it is not likely that someone would sign a similar contract with the homebuilder in the next period, the current contract is not repeatable. If the homebuilder signs a contract to do ad hoc work (i.e. unusual) at a local airport (i.e. unusual customer), such a contract would not be deemed repeatable.

If ExchQ is not repeatable, then PostFFT is called as shown below, but with the credit to ExchQAMM rather than ExchQR, and the debit to ExchQLMM rather than ExchQE. As discussed before, the credit could be split, with say 35% to ExchQR and 65% to ExchQAMM.

If ExchQ is repeatable, which is the assumed case, then posting to PostFFT is done with:

```
debt = ExchQA
debitScenario = ScenarioFlowIn1
credit = ExchQR
creditScenario =
futureDate =
futureValue =
``` where futureDate equals the values in Column A of FIG. 11 and futureValue equals the values in Column B. Posting to PostFFT is also done with:

```
debt = ExchQA
debitScenario = ScenarioFlowIn2
credit = ExchQR
creditScenario =
futureDate =
futureValue =
``` where futureDate equals the values in Column A of FIG. 11 and futureValue equals the values in Column D. Posting to PostFFT is also done with:

```
debt = ExchQE
debitScenario =
credit = ExchQL
creditScenario = ScenarioFlowOut1
futureDate =
futureValue =
``` where futureDate equals the values in Column A of FIG. 11 and futureValue equals the values in Column F.

The three postings to PostFFT result in the posting of Rows 10-25 of the Future Flow Table as shown in FIG. 14. The resulting credits and debits are shown in Rows 14-29 in FIG. 15. The result, as shown in the balance sheet of FIG. 17, is that ExchQA has a value of $24,757.74 (present value), and ExchQL has a value of $6723.09 (present value).

As the final transaction for 2000, the Company purchases an automobile for $1000. This triggers a credit to CashA and a debit to account AutoA. The $0.15 per mile cost is reflected in the prior-art cost-accounting subsystem. The yearly depreciation is reflected by entering a negative r in the Asset and Liability Table as shown in FIG. 12, Rows 8.

In Step 905, the Ex Ante Equation is applied to each asset and liability listed in the Asset and Liability Table. This triggers credits and debits to the Market Moves and Market Income accounts, as shown in Rows 31-38 of FIG. 15.

In Step 907, the income statement for 2000 is generated, and the results are as shown in FIGS. 16A and 16B. The net income of $20,407.55 is the present invention's best estimate of the Company's "Going concern earnings power" income. Assuming that the status quo is maintained, this net income could be paid to shareholders, with the expectation that at the end of 2001, $20,407.55 could again be paid, while leaving intact both net assets and the expectation that at the end of 2002, $20,407.55 could again be paid. This result occurs because of the application of the Ex Ante Equation, and the strategic structuring and tallying of the data as shown here.

In Step 909, the balances of the Income accounts are swept into the shareholder equity account, in the same way that current accounting practice sweeps revenue and expense accounts into shareholder equity.

In Step 911, the balance sheet for 2000 is generated, and the results are as shown in FIG. 17.

Extended Example: Year 2001 Period

During the next accounting period, Year 2001, credits and debits are posted as described below. Most importantly, all steps of FIG. 9 are demonstrated.

Step 903A entails posting credits and debits and using PostFFT as described above and below.

Step 903B entails identifying matching and canceling credits and debits that have identical amounts and identical dates and that have dates prior to the current date. Such identified credits and debits are then removed from the Future Flow Table. This process may leave and identify stray entries, such as the credit in Row 20 of FIG. 14. (The current accounting period is Year 2001, and the entry in the Future Flow Table has a prior date.) The underlying causes and explanation for such stray entries are identified and addressed, thus allowing removal from the Future Flow Table.

So for example, upon investigation, it could be determined that a department within the Company has yet to spend the $5000, but plans to spend it in 2001. Accordingly, to reverse the entry of Row 20 of FIG. 14, posting to PostFFT is done with:

```
debt = ExchQL
debitScenario = ScenarioFlowOut1
credit = ExchQMM
creditScenario =
futureDate = 2000
futureValue = 5000
```

To reinstate the $5000 in the Future Flow Table, posting to PostFFT is then done with:

```
debt = ExchQMM
debitScenario =
credit = ExchQL
creditScenario = ScenarioFlowOut1
futureDate = 2001
futureValue = 5000
```

In both cases, the offsetting account is the Market Moves account because a change in the value of ExchQL could, and here does, occur as a result of the updating. This posting results in a favorable reduction in the liability, because the $5000 is pushed one period into the future. Such a change in a Positional account is, and needs to be, reflected in the Market Moves section of the balance sheet.

Step 903C entails computing the present values of the credits and debits in the Future Flow Table, and then generating credits and debits so that the corresponding asset and liability account values are updated. So, for example, assuming that the date has advanced to 2001, computing the present value for LeaseA yields $488.16, as shown in FIG. 18A, which is based upon Rows 2-5 of the Future Flow Table of FIG. 14. The value of LeaseA has increased by $44.38 from its previous value as shown on the balance sheet in FIG. 17. Accordingly, LeaseA is debited $44.38 and LeaseAMM is credited.

Performing this updating for all asset and liability accounts defined by the Future Flow Table, with an incremented date of 2001, results in the credits and debits as shown in Rows 3-7 of FIG. 19.

Step 903D entails determining market values via public market trades, private market trades, or via appraisals, and then making appropriate postings. So, for example, suppose that BldEqyA has risen in value to $4050. The $50 increase is posted as a debit to BldEqyA and a credit to BldEqyAMM. Suppose that BondA has dropped in value to $790. The $10 decrease is posted as a credit to BondA and a debit to BondAMM. Simultaneously with the $10 posting, BondA's expected return is recomputed and the resulting r used to update the entry in the Asset and Liability Table, FIG. 12, Row 5. (In this extended example, for reasons of simplicity, r is not updated.)

After, during, and before execution of Steps 903B, 903C, and 903D, Step 903A can continue to be performed, as described above and immediately below.

In re-examining the pension obligations incurred in 2000, an additional $171.49 is discovered that needs to be paid in 2009. Given this unfavorable development, posting to PostFFT is done with:

```
debt = PensionLMM
debitScenario =
credit = PensionL
creditScenario = ScenarioPensionL
futureDate = 2009
futureValue = 171.49
```

The Company again grants employees a ten-year pension with a present value of $200. As before, posting to PostFFT is done with:

```
debt = PensionE
debitScenario =
credit = PensionL
creditScenario = ScenarioPensionL
futureDate = 2011
futureValue = 518.75
```

A building rental, or stock dividend, payment of $330 is received from BdEqyA. This is treated as a favorable Market Move: CashA is debited $330 and BldEqyAMM is credited. The expectation in such handling is that the BldEqyA has been, or will be, marked-to-market, so that BldEqyAMM will reflect the total gains resulting from holding BldEqyA in 2001. BondA is handled similarly. Supposing that its issuer makes a coupon payment of $55.28, then CashA is debited and BondAMM is credited. (If an asset is defined by the Future Flow Table, PostFFT is used to post a future credit and debit CashA.)

In reverse, BldEqyA requires a $125 payment. If BldEqyA is a building, then the payment could be required for maintenance. If BldEqyA is share of stock, assume that it is a share in a private partnership that has a $125 capital call (i.e. the partners are asked to contribute additional capital). In both cases, per the present invention, the $125 is treated as an unfavorable Market Move: CashA is credited $125 and BldEqyAMM is debited.

LeaseA is an asset and, like any other asset, it can change in market value. As an example, suppose LeaseA regards office space in San Francisco. The value of such office space fluctuates, so accordingly, the value of LeaseA also fluctuates. Supposing that office space prices have risen 50%, it reasonably follows that the value of LeaseA has also risen 50%, as shown in FIG. 18B. Accordingly, posting to PostFFT is done four times with:

```
debt = LeaseA
debitScenario = ScenarioLeaseA
credit = LeaseAMM
creditScenario =
futureDate =
futureValue = 70
``` where futureDate is interactively 2001, 2002, 2003, and 2004. This results in the account balance of LeaseA equaling its current market value.

In the current period, 2001, the flow-out for ExchQL proves to be only $4,500 and not the previously estimated $5,000. Posting to PostFFT is done with:

```
debt = ExchQL
debitScenario = ScenarioFlowOut1
credit = CashA
creditScenario =
futureDate = 2001
futureValue = 4500
```

The $500 gain is also posted to PostFFT with:

```
debt = ExchQL
debitScenario = ScenarioFlowOut1
credit = ExchQLMM
creditScenario =
futureDate = 2001
futureValue = 500
```

Scenario ScenarioFlowIn1 in 2007 entails a receipt of $10,000. The $10,000 has been renegotiated to $9,000. The $1000 reduction is posted to PostFFT with:

```
debt = ExchQAMM
debitScenario =
credit = ExchQA
creditScenario = ScenarioFlowIn1
futureDate = 2007
futureValue = 1000
```

The automobile (AutoA) is driven for 100 miles. Per the cost accounting system, AutoA is charged $15.00.

LeaseA is charged $210, in part because of product and service costs identified by the cost accounting subsystem, and in part because some of its value was never used, is forever lost, and is thus written-off. The charge for the lease is $210 and not $140, because its value has increased and the value increase recognized. Because LeaseA is defined by the Future Flow Table, the posting is done via PostFFT with:

```
debt = LeaseAE
debitScenario =
credit = LeaseA
creditScenario = ScenarioLeaseA
futureDate = 2001
futureValue = 210
```

The LeaseL 2001 payment is made and again the posting is done via PostFFT with:

```
debt = LeaseL
debitScenario = ScenarioLeaseL
credit = CashA
creditScenario =
futureDate = 2001
futureValue = 140
```

Revenues of $6500 are posted as a debit to CashA and credit to RevMiscR.

The final step of Step 903 in the present example is to address interest payments as regards to CashA. Given a received interest payment of $546, CashA is debited and CashAMM is credited. Given that CashA earns 2% interest, Row 9 is appended to the Asset and Liability Table of FIG. 12 so that the Ex Ante Equation is applied to CashA.

In Step 905, the Ex Ante Equation is applied to each asset and liability listed in the Asset and Liability Table. This triggers credits and debits to the Market Moves and Market Income accounts, as shown in Rows 27-35 of FIG. 19.

In Step 907, the income statement for 2001 is generated, and the results are as shown in FIGS. 20A and 20B. The net income of $10,215.50 is the present invention's best estimate of the Company's "Going concern earnings power" income. Assuming that the status quo is maintained, this net income could be paid to shareholders, with the expectation that at the end of 2002, $10,215.50 could again be paid, while leaving intact both net assets and the expectation that at the end of 2003, $10,215.50 could yet again be paid. This result occurs because of the application of the Ex Ante Equation, and the strategic structuring and tallying of the data as shown herein.

In Step 909, the balances of the Income accounts are swept into the shareholder equity account, in the same way that current accounting practice sweeps revenue and expense accounts into shareholder equity.

In Step 911, the balance sheet for 2001 is generated, and the results are as shown in FIG. 21.

In Step 913, the income statement of FIG. 20A and FIG. 20B, and the balance sheet of FIG. 21 are disseminated for use by Consumers.

Because of how data is internally structured, both the generated income statement and balance sheet could be made available over the internet in an interactive format. In this format, the Consumer selects and drags items for netting and display. So, for instance, with the income statement of FIG. 20A and FIG. 20B, the Consumer could drag LeaseLMI next to LeaseAMI and then make an indication that the two entries are to be aggregated. This would provide the Consumer with a net Market Income for the lease. Similarly, the Consumer might group LeaseA and LeaseL from the balance sheet in FIG. 21 in order to obtain the Company's net position as regards the lease. In this interactive format, the Consumer could also "drill-down" into underlying data. So, for instance, the Consumer might double-chick on a income statement item to view of an itemization of the accounts that had been aggregated together to form the entry that was clicked upon. The user might also click on BldEqyA, and assuming that it represents a share of stock, view the financial statements for BldEqyA. (This disclosure has focused on providing detailed non-aggregated data to the Consumer. As is well known, such data is easily aggregated. Assuming that such aggregation has occurred, then it becomes desirable for the Consumer to be able to inspect the original non-aggregated raw data.)

Perhaps the most useful interactive format to use over the Internet is for the Consumer to:
- view the income statement and balance sheet,
- click on an income statement or balance sheet entry,
- if it exists, view the entry's underlying data contained in the Future Flow Table,
- specify a custom r for use in the Ex Ante Equation, and then have both the income statement and balance sheet regenerated to be reflective of the customized r.

(The Consumer Could Also have Access to the Scenario Probability Table and Enter their own Probability Estimates.)

Naturally, with the exception of the original equity posting with CashA debited and Shareholder Equity credited, a counter-party to the above transactions would make similar postings in their accounting system, but with credits and debits reversed. In particular, assuming that there is a single-counter party in ExchQ, this counter-party would post the cash receipt of $4500 using PostFFT with:

```
debt = CashA
debitScenario =
credit = ExchQA
creditScenario = ScenarioFlowOut1
```

-continued

```
futureDate = 2001
futureValue = 4500
```

This, however, raises a seeming contradiction, which proves not to be contradictory. As shown above in regards to BldEqyA, when the Company receives the $330 rental payment, CashA is debited and BldEqyAMM credited. When the counter-party to ExchQ receives the $4500, as shown immediately above, the posting does not pass through the income statement accounts. The difference occurs because as regards the rental payment, it is assumed that the value of BldEqyA remains constant until it is next marked-to-market. When the Company's counter-party receives the $4500, there is no gain or loss on ExchQA, so consequently the transactions does not need to pass through the income statement. (The loss to the counter-party resulting from the receipt changing from $5000 to $4500 is handled separately—as the mirror image of what is described above.)

Source Code Introduction

Software to perform the essential aspects of the present invention is included as part of this disclosure.

Class EAE_AS (Ex Ante Equation Accounting System) performs most Steps shown in FIG. 9, specifically Steps 903A, 903C, 905, 907, 909, and 911. These steps are performed by calling EAE_AS's functions with names that correspond to the descriptions in FIG. 9. EAE_AS has a PostFFT function. Account creation occurs upon first use.

Zv classes manage data tables. EAE_AS is derived from a Zv class with a table of two columns: account and amount. This class stores current account balances for use by EAE_AS. Variable nRow of the Zv class contains the number of table rows.

The three tables, Asset and Liability, Scenario Probability, and Future Flow, are managed by classes of the same name, which are also derived from Zv classes that do basic data management. Zv classes perform searches, and append and delete table rows.

```
//~~~~~~~~~~~~~~~~~~~~~~~~~~~~]EAE_AS.h[~~~~~~~~~~~~~~~~~~~~~~~~~~~
include "ZvEAE_AS.h"
include "AssetAndLiabilityTable.h"
include "FutureFlowTable.h"
include "ScenarioProbabilityTable.h"
    extern CString shareEquity;
    double DoExAnteEquationCalculation( double alValue, double r );
class  EAE_AS  : public ZvEAE_AS
    {
    public:
        TM lLog;
            EAE_AS();
    void    Post( CString debit, CString credit, double val );
    void    PostFFT( ScenarioProbabilityTable& spt, FutureFlowTable&
futureFlowTable, CString debitAccount, CString debitScenario, CString
```

```
creditAccount, CString creditScenario, double futureDate, double
futureValue );
     void    MarkToPresentValue( AssetAndLiabilityTable&
assetAndLiabilityTable, ScenarioProbabilityTable&
scenarioProbabiltyTable, FutureFlowTable& futureFlowTable );
     void    ApplyExAnteEquation( AssetAndLiabilityTable&
assetAndLiabilityTable, ScenarioProbabilityTable&
scenarioProbabiltyTable, FutureFlowTable& futureFlowTable );
     void    GenIncomeStatement( TM& incomeStatement );
     void    SweepIncomeAccounts();
     void    GenBalanceSheet( TM& balanceSheet );
     double  GetAccountBalance( CString accountName );
     double  GetComprehensiveIncome();
     DECLARE_SERIAL(EAE_AS);
     };
//~~~~~~~~~~~~~~~~~~~~~~~~~~~~]EAE_AS.cpp[~~~~~~~~~~~~~~~~~~~~~~~~~~
~
include "stdafx.h"
include "EAE_AS.h"
include "EAE_AS.h"
include "AssetAndLiabilityTable.h"
include "IsAccount.h"
     CString shareEquity = "Shareholder EquityL";
EAE_AS::EAE_AS()
     {
     Append("CashA", 0);
     Append(shareEquity, 0);
     }
void EAE_AS::Post(CString debit, CString credit, double val)
     {
     if(val)
         {
         double sign = -1;
         long iDebit = AccountFind(debit);
         if(iDebit == -1)
             {
             Append(debit, 0);
             iDebit = nRow -1;
             }
         sign = 0.0;
         if( IsAsset(     debit) ) sign = +1.0;
         else if( IsE(         debit) ) sign = +1.0;
         else if( IsLMI(       debit) ) sign = +1.0;
         else if( IsLMM(       debit) ) sign = +1.0;
         else if( IsLiability( debit) ) sign = -1.0;
         else if( IsR(         debit) ) sign = -1.0;
         else if( IsAMI(       debit) ) sign = -1.0;
         else if( IsAMM(       debit) ) sign = -1.0;
         amount[iDebit] = amount[iDebit] + sign * val;
         long iCredit = AccountFind(credit);
         if(iCredit == -1)
             {
             Append(credit, 0);
             iCredit = nRow -1;
             }
         sign = 0.0;
         if( IsAsset(     credit) ) sign = -1.0;
```

```
            else if( IsE(         credit) ) sign = -1.0;
            else if( IsLMI(       credit) ) sign = -1.0;
            else if( IsLMM(       credit) ) sign = -1.0;
            else if( IsLiability( credit) ) sign = +1.0;
            else if( IsR(         credit) ) sign = +1.0;
            else if( IsAMI(       credit) ) sign = -1.0;
            else if( IsAMM(       credit) ) sign = -1.0;
            amount[iCredit] = amount[iCredit] + sign * val;
            long iRow = lLog.body.nRow;
            lLog.ColumnPut( "Debit",  iRow, debit  );
            lLog.ColumnPut( "Credit", iRow, credit );
            lLog.ColumnPut( "Amount", iRow, val    );
            }
    }
void EAE_AS::PostFFT(ScenarioProbabilityTable& spt, FutureFlowTable&
futureFlowTable, CString debitAccount, CString debitScenario, CString
creditAccount, CString creditScenario, double futureDate, double
futureValue)
    {
    if(futureValue)
        {
        double probabilty = 1;
        if(CSLen(debitScenario))
            {
            futureFlowTable.Append(debitAccount, debitScenario,
futureDate, "Debit", futureValue);
            probabilty = spt.GetScenarioProbability(debitAccount,
debitScenario);
            }
        if(CSLen(creditScenario))
            {
            futureFlowTable.Append(creditAccount, creditScenario,
futureDate, "Credit", futureValue);
            probabilty = spt.GetScenarioProbability(creditAccount,
creditScenario);
            }
        Post(debitAccount, creditAccount, probabilty *
futureFlowTable.GetPresentValue(futureValue, futureDate));
        }
    }
void EAE_AS::MarkToPresentValue(AssetAndLiabilityTable&
assetAndLiabilityTable, ScenarioProbabilityTable&
scenarioProbabiltyTable, FutureFlowTable& futureFlowTable )
    {
    for( long i=0; i<assetAndLiabilityTable.nRow; i++ )
        {
        CString account = assetAndLiabilityTable.account[i];
        double  r       = assetAndLiabilityTable.r[i];
        double accountingSystemBalance = GetAccountBalance(account);
        if(assetAndLiabilityTable.positionValueBasis[i] ==
"PresentValue")
            {
            double futureFlowPresentValue =
futureFlowTable.GetPresentValue(account, scenarioProbabiltyTable);
            if(IsAsset(account))
                {
                if(accountingSystemBalance < futureFlowPresentValue)
```

```
                        Post(account, account + "MM",
futureFlowPresentValue - accountingSystemBalance);
                else if(accountingSystemBalance >
futureFlowPresentValue)
                        Post(account + "MM", account,
accountingSystemBalance - futureFlowPresentValue);
                }
            else if(IsLiability(account))
                {
                if(accountingSystemBalance < futureFlowPresentValue)
                        Post(account + "MM", account,
futureFlowPresentValue - accountingSystemBalance);
                else if(accountingSystemBalance >
futureFlowPresentValue)
                        Post(account, account + "MM",
accountingSystemBalance - futureFlowPresentValue);
                }
            else
                {
                // error!
                }
            }
        }
    }
double DoExAnteEquationCalculation( double alValue, double r)
    {
    double marketIncome = alValue * (1 - 1/(1+r));
    return marketIncome;
    }
void EAE_AS::ApplyExAnteEquation(AssetAndLiabilityTable&
assetAndLiabilityTable, ScenarioProbabilityTable&
scenarioProbabiltyTable, FutureFlowTable& futureFlowTable )
    {
    for( long i=0; i<assetAndLiabilityTable.nRow; i++ )
        {
        CString account = assetAndLiabilityTable.account[i];
        double    r      = assetAndLiabilityTable.r[i];
        if(assetAndLiabilityTable.positionValueBasis[i] ==
"MarketValue")
            {
            double accountingSystemBalance =
GetAccountBalance(account);
            double marketIncome =
DoExAnteEquationCalculation(accountingSystemBalance, r);
            if(0<marketIncome)
                {
                if(IsAsset(account))
                    Post(account + "MM", account + "MI", marketIncome);
                else if(IsLiability(account))
                    Post(account + "MI", account + "MM", marketIncome);
                else
                    {
                    // error!
                    }
                }
            else if(0>marketIncome)
                {
```

```
                    if(IsAsset(account))
                        Post(account + "MI", account + "MM", -
marketIncome);
                    else if(IsLiability(account))
                        Post(account + "MM", account + "MI", marketIncome);
                    else
                        {
                        // error!
                        }
                    }
            }
        else if(assetAndLiabilityTable.positionValueBasis[i] ==
"PresentValue")
                {
                double futureFlowPresentValue =
futureFlowTable.GetPresentValue(account, scenarioProbabiltyTable);
                double marketIncome =
DoExAnteEquationCalculation(futureFlowPresentValue, r);
                if(IsAsset(account))
                    Post(account + "MM", account + "MI", marketIncome);
                else if(IsLiability(account))
                    Post(account + "MI", account + "MM", marketIncome);
                else
                    {
                    // error!
                    }
                }
            }
    }
void EAE_AS::GenIncomeStatement(TM& incomeStatement)
    {
    double sp1 =  1;
    double sn1 = -1;
    long i, j;
    i = AccountFind(shareEquity);
    Append(shareEquity, amount[i]);
    RowDelete(i);
    incomeStatement.Init();
    incomeStatement.RowPutTitle("Going Concern");
    incomeStatement.RowPutTitle("____Operating Income");
    double cumIncome = 0;
    if(TRUE)
        {
        long sign=1;
        incomeStatement.RowPutTitle("_____Revenues");
        double val = 0;
        for( i=0; i<nRow; i++ )
            if(HasRight(account[i], "R"))
                {
                incomeStatement.RowPut("_____" + account[i], 1,
amount[i]);
                val = val + amount[i];
                }
        incomeStatement.RowPut("_____Total Revenues", 2, sign *
val);
        cumIncome = cumIncome + sign *val;
        }
```

```
    if(TRUE)
        {
        long sign=-1;
        incomeStatement.RowPutTitle("_____Expenses");
        double val = 0;
        for( i=0; i<nRow; i++ )
            if(HasRight(account[i], "E"))
                {
                incomeStatement.RowPut("_____" + account[i], 1,
- amount[i]);
                val = val - amount[i];
                }
        incomeStatement.RowPut("_____Total Expenses", 2, val);
        cumIncome = cumIncome + val;
        }
    incomeStatement.RowPut("____Total Operating Income", 3, cumIncome);
    incomeStatement.RowPutTitle("____Market Income (Expected)");
    double netMI = 0;
    if(TRUE)
        {
        if(TRUE)
            {
            double val = 0;
            incomeStatement.RowPutTitle("_____Asset Appreciations");
            for( i=0; i<nRow; i++ )
                if(IsAMI(account[i]) && 0 < amount[i])
                    {
                    incomeStatement.RowPut("_____" + account[i],
1, amount[i]);
                    val += amount[i];
                    }
            incomeStatement.RowPut("_____Total Asset Appreciations",
2, val);
            netMI = netMI + val;
            }
        if(TRUE)
            {
            double val = 0;
            incomeStatement.RowPutTitle("_____Asset Depreciations");
            for( i=0; i<nRow; i++ )
                if(IsAMI(account[i]) && 0 > amount[i])
                    {
                    incomeStatement.RowPut("_____" + account[i],
1, amount[i]);
                    val += amount[i];
                    }
            incomeStatement.RowPut("_____Total Asset Depreciations",
2, val);
            netMI = netMI + val;
            }
        if(TRUE)
            {
            double val = 0;
            incomeStatement.RowPutTitle("_____Favorable Liability
Depreciations");
            for( i=0; i<nRow; i++ )
                if(IsLMI(account[i]) && 0 > amount[i])
```

```
                    {
                    incomeStatement.RowPut("_____" + account[i],
1, - amount[i]);
                    val += - amount[i];
                    }
            incomeStatement.RowPut("_____Total Liability
Depreciations", 2, val);
            netMI = netMI + val;
            }
        if(TRUE)
            {
            double val = 0;
            incomeStatement.RowPutTitle("_____Unfavorable Liability
Appreciations");
            for( i=0; i<nRow; i++ )
                if(IsLMI(account[i]) && 0 < amount[i])
                    {
                    incomeStatement.RowPut("_____" + account[i],
1, - amount[i]);
                    val += - amount[i];
                    }
            incomeStatement.RowPut("_____Total Liability
Appreciations", 2, val);
            netMI = netMI + val;
            }
        }
    incomeStatement.RowPut("____Total Market Income", 3, netMI);
    cumIncome += netMI;
    incomeStatement.RowPut("Net Income (Total Going Concern Income)",
4, cumIncome);
    incomeStatement.BlankRowAppend();
    incomeStatement.RowPutTitle("Market Moves");
    double netMM = 0;
    if(TRUE)
        {
        if(TRUE)
            {
            double val = 0;
            incomeStatement.RowPutTitle("____Asset Gains");
            for( i=0; i<nRow; i++ )
                if(HasRight(account[i], "AMM") && 0 < amount[i])
                    {
                    incomeStatement.RowPut("_____" + account[i], 1,
amount[i]);
                    val += amount[i];
                    }
            incomeStatement.RowPut("____Total Asset Gains", 2, val);
            netMM += val;
            }
        if(TRUE)
            {
            double val = 0;
            incomeStatement.RowPutTitle("____Asset Losses");
            for( i=0; i<nRow; i++ )
                if(HasRight(account[i], "AMM") && 0 > amount[i])
                    {
```

```
                            incomeStatement.RowPut("_____" + account[i], 1,
amount[i]);
                        val += amount[i];
                        }
                incomeStatement.RowPut("____Total Asset Losses", 2, val);
                netMM += val;
                }
            if(TRUE)
                {
                double val = 0;
                incomeStatement.RowPutTitle("____Favorable Liability
Gains");
                for( i=0; i<nRow; i++ )
                    if(HasRight(account[i], "LMM") && 0 > amount[i])
                        {
                        incomeStatement.RowPut("_____" + account[i], 1,
- amount[i]);
                        val += - amount[i];
                        }
                incomeStatement.RowPut("____Total Liability Gains", 2,
val);
                netMM += val;
                }
            if(TRUE)
                {
                double val = 0;
                incomeStatement.RowPutTitle("____Unfavorable Liability
Losses");
                for( i=0; i<nRow; i++ )
                    if(HasRight(account[i], "LMM") && 0 < amount[i])
                        {
                        incomeStatement.RowPut("_____" + account[i], 1,
- amount[i]);
                        val += amount[i];
                        }
                incomeStatement.RowPut("____Total Liability Losses", 2, -
val);
                netMM -= val;
                }
            }
    incomeStatement.RowPut("Total Market Moves Income", 4, netMM);
    incomeStatement.BlankRowAppend();
    incomeStatement.RowPut("Total Comprehensive Income", 5, cumIncome +
netMM);
    }
void EAE_AS::SweepIncomeAccounts()
    {
    amount[AccountFind(shareEquity)] += GetComprehensiveIncome();
    for( long i=0; i<nRow; i++ )
        if( IsE(   account[i] )) amount[i] = 0;
        else if( IsLMI( account[i] )) amount[i] = 0;
        else if( IsLMM( account[i] )) amount[i] = 0;
        else if( IsR(   account[i] )) amount[i] = 0;
        else if( IsAMI( account[i] )) amount[i] = 0;
        else if( IsAMM( account[i] )) amount[i] = 0;
    lLog.body.nRow = 0;
    lLog.echo.nRow = 0;
```

```
    lLog.head.nRow = 0;
    lLog.body.nCol = 0;
    lLog.echo.nCol = 0;
    }
void EAE_AS::GenBalanceSheet(TM& balanceSheet)
    {
    double sp1 =  1;
    double sn1 = -1;
    long i, j;
    i = AccountFind(shareEquity);
    Append(shareEquity, amount[i]);
    RowDelete(i);
    balanceSheet.Init();
    double assets=0, liabilities = 0;
    for( i=0; i<nRow; i++ )
        {
        long iRow = balanceSheet.body.nRow;
        if(HasRight(account[i], "A"))
            {
            balanceSheet.ColumnPut("Account", iRow, account[i]);
            balanceSheet.ColumnPut("Assets",  iRow, amount[ i]);
            assets += amount[i];
            }
        else if(HasRight(account[i], "L"))
            {
            balanceSheet.ColumnPut( "Account",     iRow,    account[i]
);
            balanceSheet.ColumnPut( "Liabilities", iRow,    amount[ i]
);
            liabilities += amount[i];
            }
        }
    if (TRUE)
        {
        long iRow = balanceSheet.body.nRow;
        balanceSheet.ColumnPut("Account", iRow, "Total");
        balanceSheet.ColumnPut("Assets",  iRow,  assets);
        balanceSheet.ColumnPut("Liabilities", iRow, liabilities);
        }
    CString tt = shareEquity;
    TrimRV(tt, "L");
    balanceSheet.SR(shareEquity, tt);
    }
double EAE_AS::GetAccountBalance(CString accountName)
    {
    long iRow = AccountFind(accountName);
    return amount[iRow];
    }
double EAE_AS::GetComprehensiveIncome()
    {
    double comprehensiveIncome = 0;
    for( long i=0; i<nRow; i++ )
        if( IsE(   account[i] )) comprehensiveIncome -= amount[i];
        else if( IsLMI( account[i] )) comprehensiveIncome -= amount[i];
        else if( IsLMM( account[i] )) comprehensiveIncome -= amount[i];
        else if( IsR(   account[i] )) comprehensiveIncome += amount[i];
        else if( IsAMI( account[i] )) comprehensiveIncome += amount[i];
```

```
        else if( IsAMM( account[i] )) comprehensiveIncome += amount[i];
    return comprehensiveIncome;
    }
//~~~~~~~~~~~~~~~~~~~~~~~~~~~~~~~~~~]AssetAndLiabilityTable.h[~~~~~~~~~~~~~
~~~~~~~~~~~~~~~~~
include "ZvAssetAndLiabilityTable.h"
class  AssetAndLiabilityTable   : public ZvAssetAndLiabilityTable
    {
    public:
    void Init();
    DECLARE_SERIAL(AssetAndLiabilityTable);
    };
//~~~~~~~~~~~~~~~~~~~~~~~~~~~~~~~~~~]AssetAndLiabilityTable.cpp[~~~~~~~~~~~
~~~~~~~~~~~~~~~~~
include "stdafx.h"
include "AssetAndLiabilityTable.h"
include "AssetAndLiabilityTable.h"
void AssetAndLiabilityTable::Init()
    {
    }
//~~~~~~~~~~~~~~~~~~~~~~~~~~~~~~~~~~]ScenarioProbabilityTable.h[~~~~~~~~~~~
~~~~~~~~~~~~~~~~~
include "ZvScenarioProbabilityTable.h"
class  ScenarioProbabilityTable  : public ZvScenarioProbabilityTable
    {
    public:
    void   Init();
    double GetScenarioProbability( CString accountLk, CString
scenarioLk );
    DECLARE_SERIAL(ScenarioProbabilityTable);
    };
//~~~~~~~~~~~~~~~~~~~~~~~~~~~~~~~~~~]ScenarioProbabilityTable.cpp[~~~~~~~~~
~~~~~~~~~~~~~~~~~~~
include "stdafx.h"
include "ScenarioProbabilityTable.h"
include "ScenarioProbabilityTable.h"
void ScenarioProbabilityTable::Init()
    {
    }
double ScenarioProbabilityTable::GetScenarioProbability(CString
accountLk, CString scenarioLk)
    {
    for( long i=0; i<nRow; i++ )
        if(accountLk == account[i] && scenarioLk == scenario[i])
            return probability[i];
    return 1;
    }
//~~~~~~~~~~~~~~~~~~~~~~~~~~~~~~~~~~]FutureFlowTable.h[~~~~~~~~~~~~~~~~~~~~
~~~~~~~~
include "ZvFutureFlowTable.h"
include "ScenarioProbabilityTable.h"
class  FutureFlowTable   : public ZvFutureFlowTable
    {
    public:
        double companyR;
        long currentDate;
    void    Init();
```

```
    double GetPresentValue( CString accountlk, CString scenarioIDlk );
    double GetPresentValue( CString accountlk,
ScenarioProbabilityTable& scenarioProbabiltyTable );
    double GetPresentValue( double futureValue, long futureDate );
    DECLARE_SERIAL(FutureFlowTable);
    };
//~~~~~~~~~~~~~~~~~~~~~~~~~~~~~]FutureFlowTable.cpp[~~~~~~~~~~~~~~~~~~
~~~~~~~~~~
include "stdafx.h"
include "FutureFlowTable.h"
include "FutureFlowTable.h"
include "EAE_AS.h"
include "IsAccount.h"
void FutureFlowTable::Init()
    {
    }
double FutureFlowTable::GetPresentValue(CString accountlk, CString
scenarioIDlk)
    {
    double presentValue = 0;
    for( long i=0; i<nRow; i++ )
        if(account[i] == accountlk)
            if(scenarioID[i] == scenarioIDlk)
                if(cdType[i] == "Debit")
                    presentValue += (1/pow(1.0 + companyR, date[i]-
currentDate)) * amount[i];
                else if(cdType[i] == "Credit")
                    presentValue -= (1/pow(1.0 + companyR, date[i]-
currentDate)) * amount[i];
    if(IsLiability(accountlk))
        presentValue = - presentValue;
    return presentValue;
    }
double FutureFlowTable::GetPresentValue(CString accountlk,
ScenarioProbabilityTable& scenarioProbabiltyTable)
    {
    double presentValue = 0;
    for( long i=0; i<scenarioProbabiltyTable.nRow; i++ )
        if(scenarioProbabiltyTable.account[i] == accountlk)
            presentValue += scenarioProbabiltyTable.probability[i] *
                            GetPresentValue(accountlk,
scenarioProbabiltyTable.scenario[i]);
    return presentValue;
    }
double FutureFlowTable::GetPresentValue(double futureValue, long
futureDate)
    {
    return (1/pow(1.0 + companyR, futureDate-currentDate)) *
futureValue;
    }
```

CONCLUSION, RAMIFICATIONS, AND SCOPE

While the above description contains many particulars, these should not be construed as limitations on the scope of the present invention; but rather, as an exemplification of one preferred embodiment thereof. As the reader who is skilled in the invention's domains will appreciate, the invention's description here is oriented towards facilitating ease of comprehension. Such a reader will also appreciate that the invention's breadth of scope can be improved by applying both prior-art techniques and readily apparent improvements.

Many variations and many add-ons to the preferred embodiment are possible. Examples of variations and add-ons include, without limitation:

- Rather than applying the Ex Ante Equation to asset and liability values at the end of the period, an alternative is to use start-of-period or average-of-period values.
- The focus in this description has been upon disaggregated accounts. Naturally, accounts, for reporting purposes, can be aggregated in any fashion deemed worthwhile.
- The Ex Ante Equation could be programmed into a hand held calculator that is used to calculate Market Income and Market Moves, which are then manually entered into a prior-art accounting system.
- The Rs of the Asset and Liability Table could be set based upon the perceived risk of the account's associated future flow. Per economic theory—higher risk, higher reward—riskier accounts should have higher rs.
- Preferred stock can be handled as a liability, with the Future Flow Table containing estimated required dividend payments by period.
- Each Position account could have its own, local, version of the Future Flow Table.

Furthermore, as the reader who is skilled in the invention's domains will appreciate, public policy, as dictated by either legislators and/or accounting boards, may eventually prescribe how the present invention is implemented and used. Such policy might not be directly aligned with the invention as presented here, but would nevertheless constitute a variation of the preferred embodiment of the present invention.

I claim:

1. A computer implemented financial accounting method, implemented on a computer usable medium having a computer readable program code embodied therein, said computer readable program code adapted to be executed to implement a method for generating and outputting an income statement, said method comprising:

provide a computer system, wherein the system comprises the computer usable medium with the computer readable program code being executed to perform the following steps:

electronically receiving, at the computer usable medium, at least one credit and one debit posting, said at least one credit and one debit posting comprising an identification of an account to be credited, an identification of an account to be debited, and a posting value to be credited to said account to be credited and to be debited to said account to be debited;

automatically updating at least one position account based upon said posting value to be credited to said account to be credited and to be debited to said account to be debited, said at least one position account being either an asset and/or a liability account;

automatically updating at least one revenue, expense, Market Moves, and/or Market Income account based upon said posting value to be credited to said account to be credited and to be debited to said account to be debited;

obtaining a balance for said at least one position account;
obtaining an r value, wherein r is an expected rate of return;
automatically using an Ex Ante Equation to calculate at least one Market Income value based upon said balance of said at least one position account and based upon said obtained r value, wherein said Ex Ante Equation being:

Market Income=(obtained balance for said at least one position account)*(1−[1/(1+r)]); and automatically outputting an income statement, said outputted income statement containing either said at least one Market Income value and/or a value that subsumes said at least one Market Income value.

2. The computer implemented financial accounting method according to claim 1 further comprising:
making data contained in said outputted income statement available for a Consumer to view using an internet connection.

3. The computer implemented financial accounting method according to claim 1 further comprising:
using an internet connection to access data contained in said outputted income statement.

4. The computer implemented financial accounting method according to claim 1 further comprising:
automatically updating both at least one Market Income account and at least one Market Moves account based upon said calculated at least one Market Income value.

5. A computer implemented financial accounting method, implemented on a computer usable medium having a computer readable program code embodied therein, said computer readable program code adapted to be executed to implement a method for generating and outputting an income statement, said method comprising:

providing a computer system, wherein the system comprises the computer usable medium with the computer readable program code being executed to perform the following steps:

inputting into the computer usable medium at least one credit and one debit posting, said at least one credit and one debit posting comprising an identification of an account to be credited, an identification of an account to be debited, and a posting value to be credited to said account to be credited and to be debited to said account to be debited;

the computer usable medium automatically updating at least one position account based upon said posting value to be credited to said account to be credited and to be debited to said account to be debited, said at least one position account being either an asset and/or a liability account;

the computer usable medium automatically updating at least one revenue, expense, Market Moves, and/or Market Income account based upon said posting value to be credited to said account to be credited and to be debited to said account to be debited;

obtaining a balance for said at least one position account;
obtaining an r value, wherein r is an expected rate of return;
the computer usable medium automatically using an Ex Ante Equation to calculate at least one Market Income value based upon said balance of said at least one position account and based upon said obtained r value, wherein said Ex Ante Equation being:

Market Income=(obtained balance for said at least one position account)*(1−[1/(1+r)]); and automatically receiving from the computer usable medium an income statement, said received income statement containing either said at least one Market Income value and/or a value that subsumes said at least one Market Income value.

6. The computer implemented financial accounting method according to claim 5 further comprising:
    making data contained in said outputted income statement available for a Consumer to view using an internet connection.

7. The computer implemented financial accounting method according to claim 5 further comprising: using an internet connection to access data contained in said received income statement.

8. The computer implemented financial accounting method according to claim 5 further comprising:
    the computer usable medium automatically updating both at least one Market Income account and at least one Market Moves account based upon said calculated at least one Market Income value.

* * * * *